Jan. 21, 1969   R. W. TRIPP   3,423,656
SPLINE INTERPOLATOR WITH INTERPOLATING POTENTIOMETERS
Filed Dec. 6, 1963

ROBERT W. TRIPP,
INVENTOR.

BY W. E. Beatty

ATTORNEY.

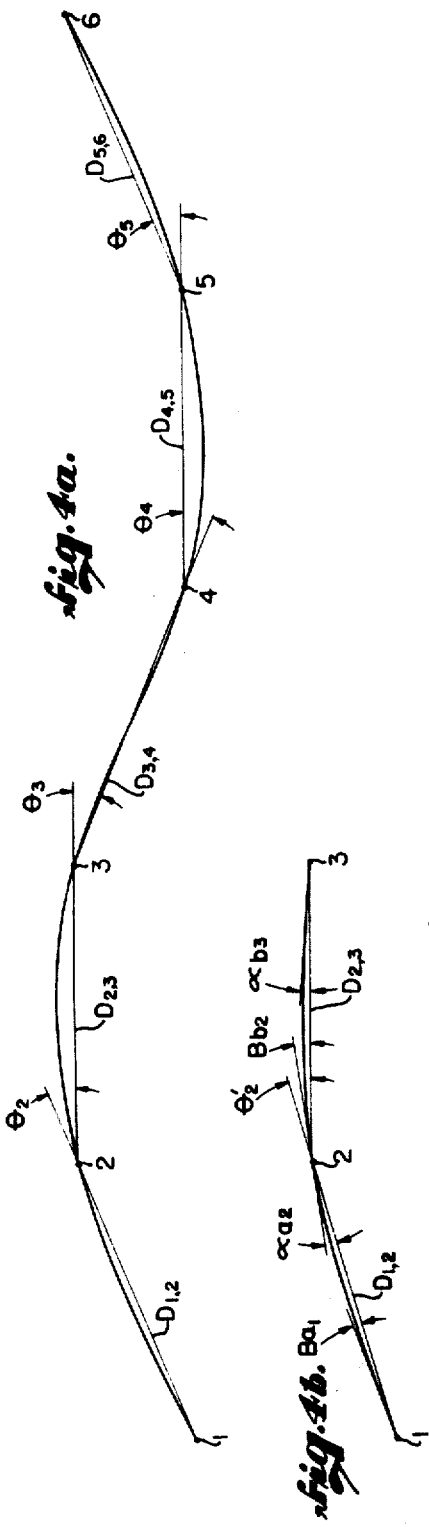
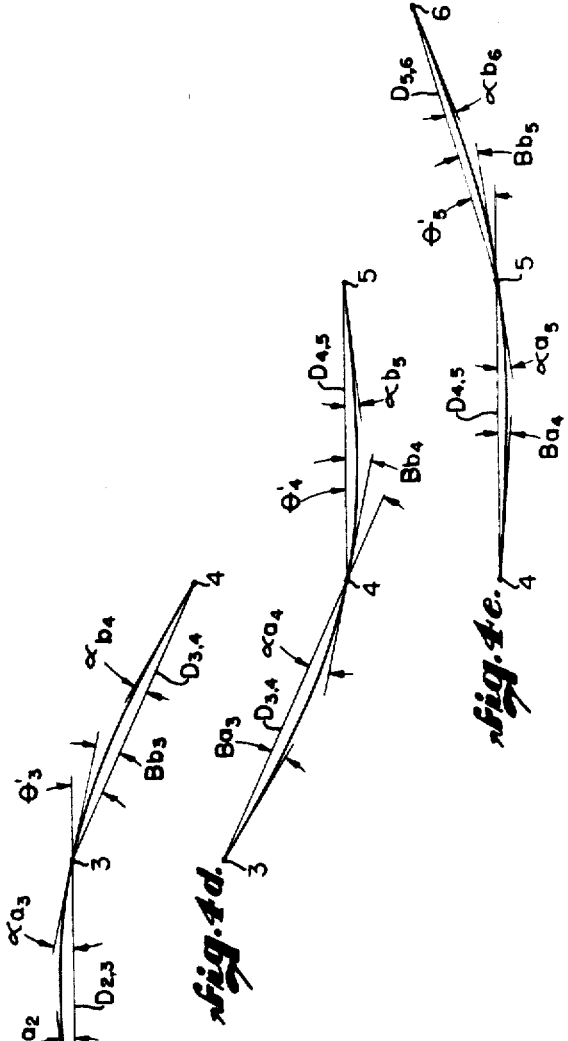

Jan. 21, 1969  R. W. TRIPP  3,423,656

SPLINE INTERPOLATOR WITH INTERPOLATING POTENTIOMETERS

Filed Dec. 6, 1963  Sheet 3 of 16

$$\Delta\Delta X = \frac{\ell}{D}(\Delta Y) = (\tan\lambda)\Delta Y$$
$$\Delta\Delta Y = \frac{\ell}{D}(\Delta X) = (\tan\lambda)\Delta X$$

ROBERT W. TRIPP,
*INVENTOR.*

BY *W. E. Beatty*

ATTORNEY.

Jan. 21, 1969    R. W. TRIPP    3,423,656
SPLINE INTERPOLATOR WITH INTERPOLATING POTENTIOMETERS
Filed Dec. 6, 1963    Sheet 4 of 16
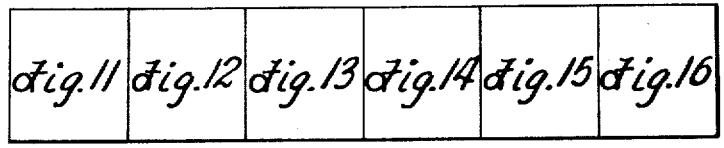
Fig. 10.
Fig. 9.
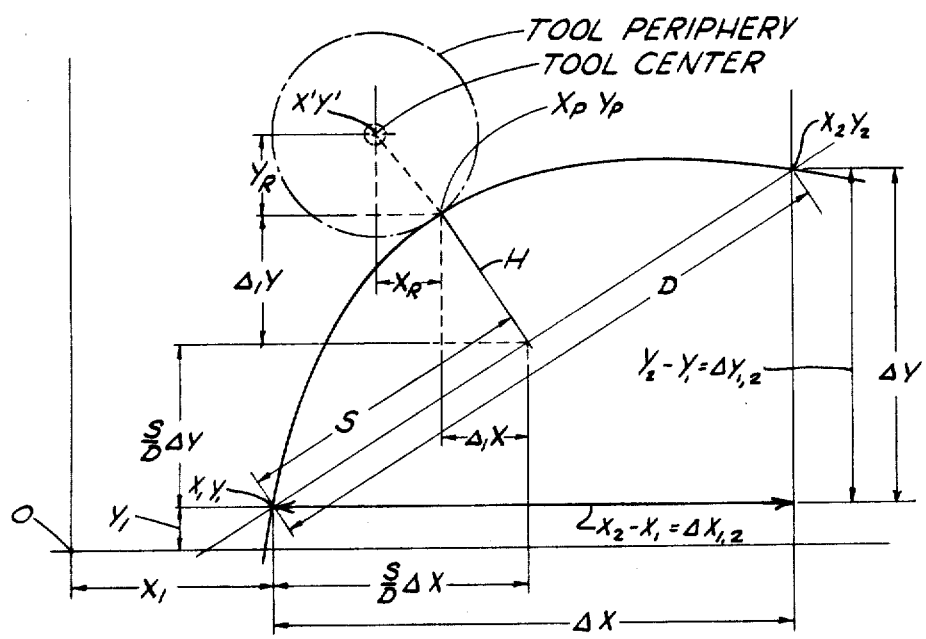
INVENTOR.
ROBERT W. TRIPP
BY W. E. Beatty
ATTORNEY.

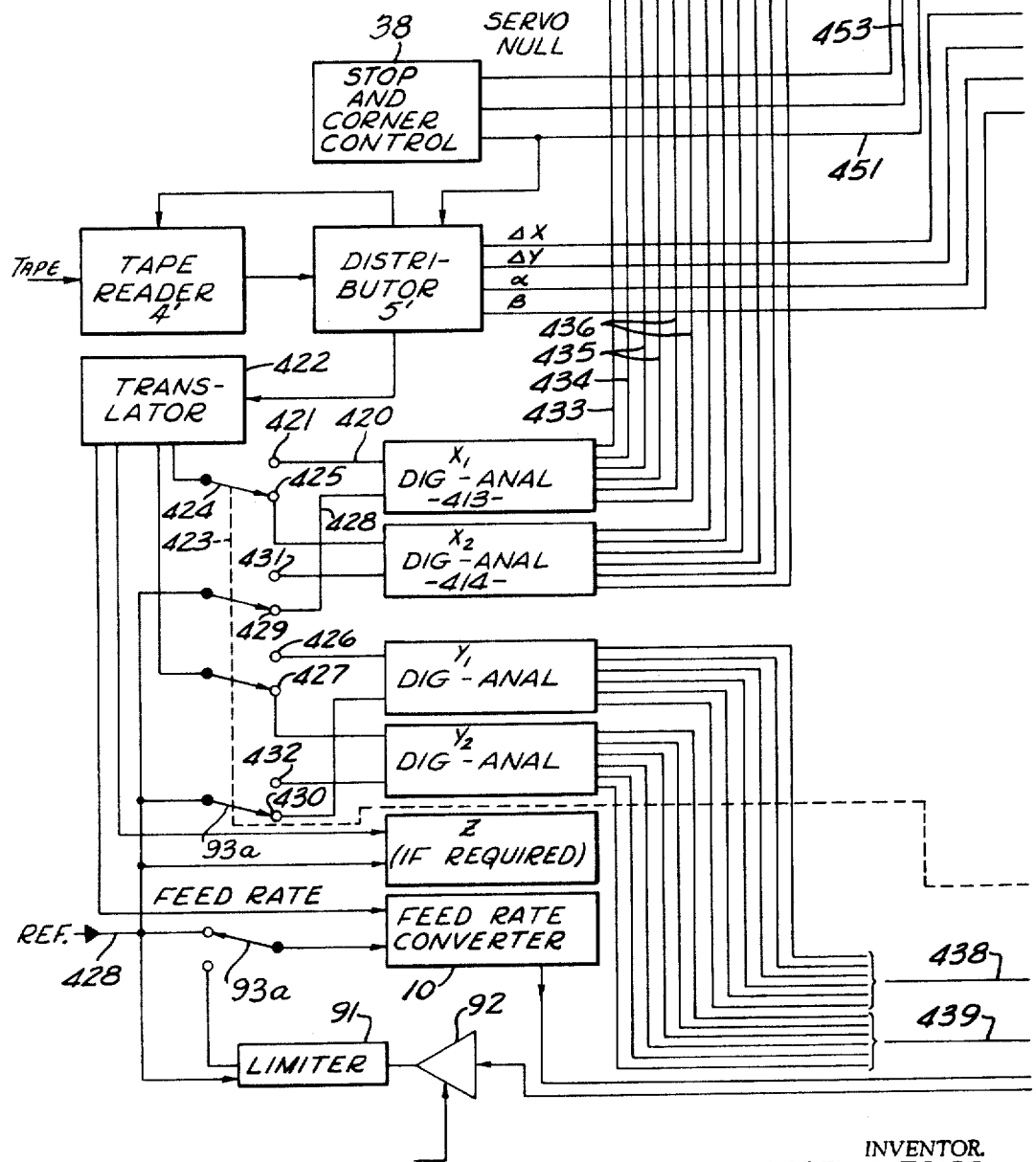

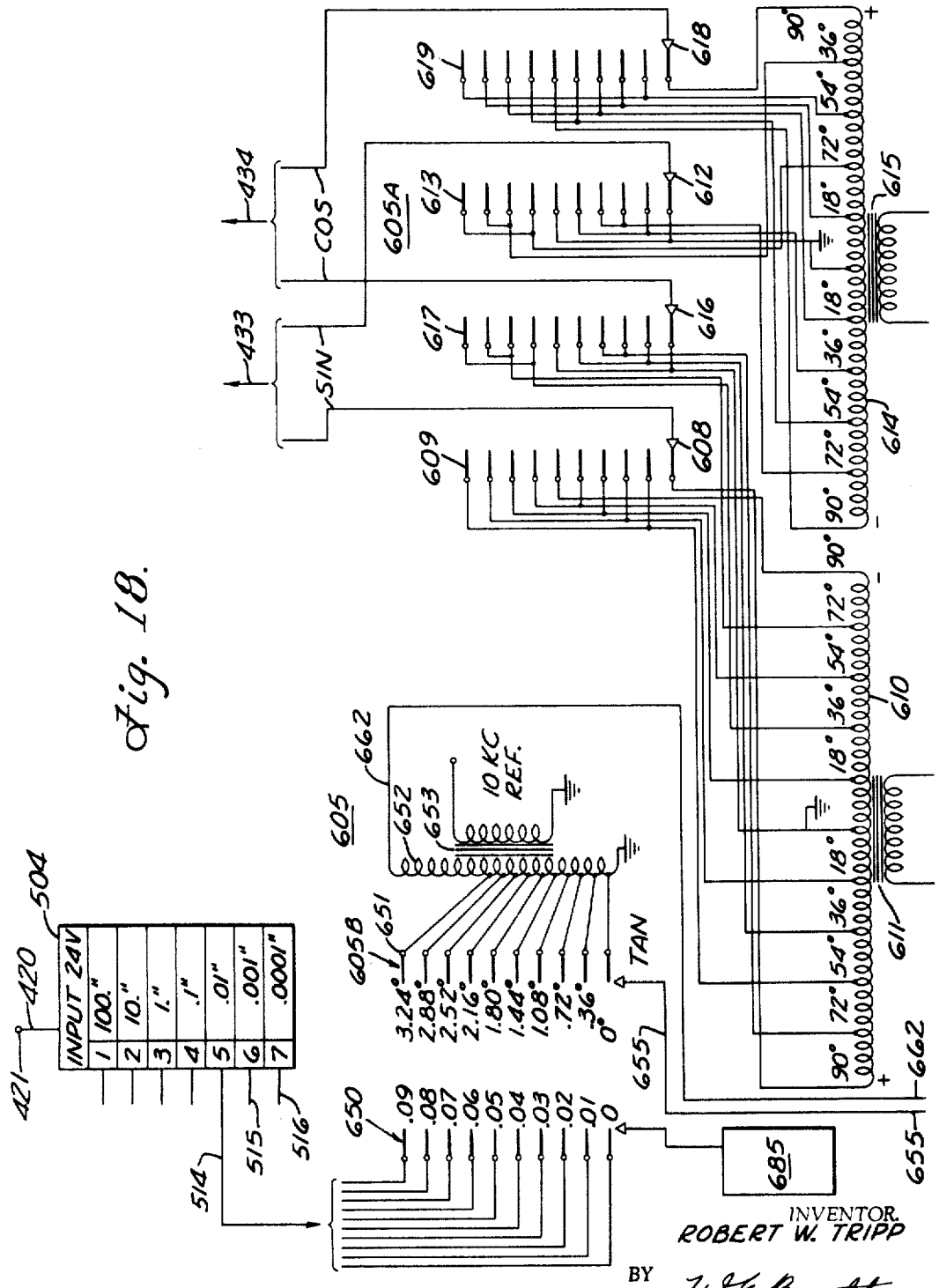

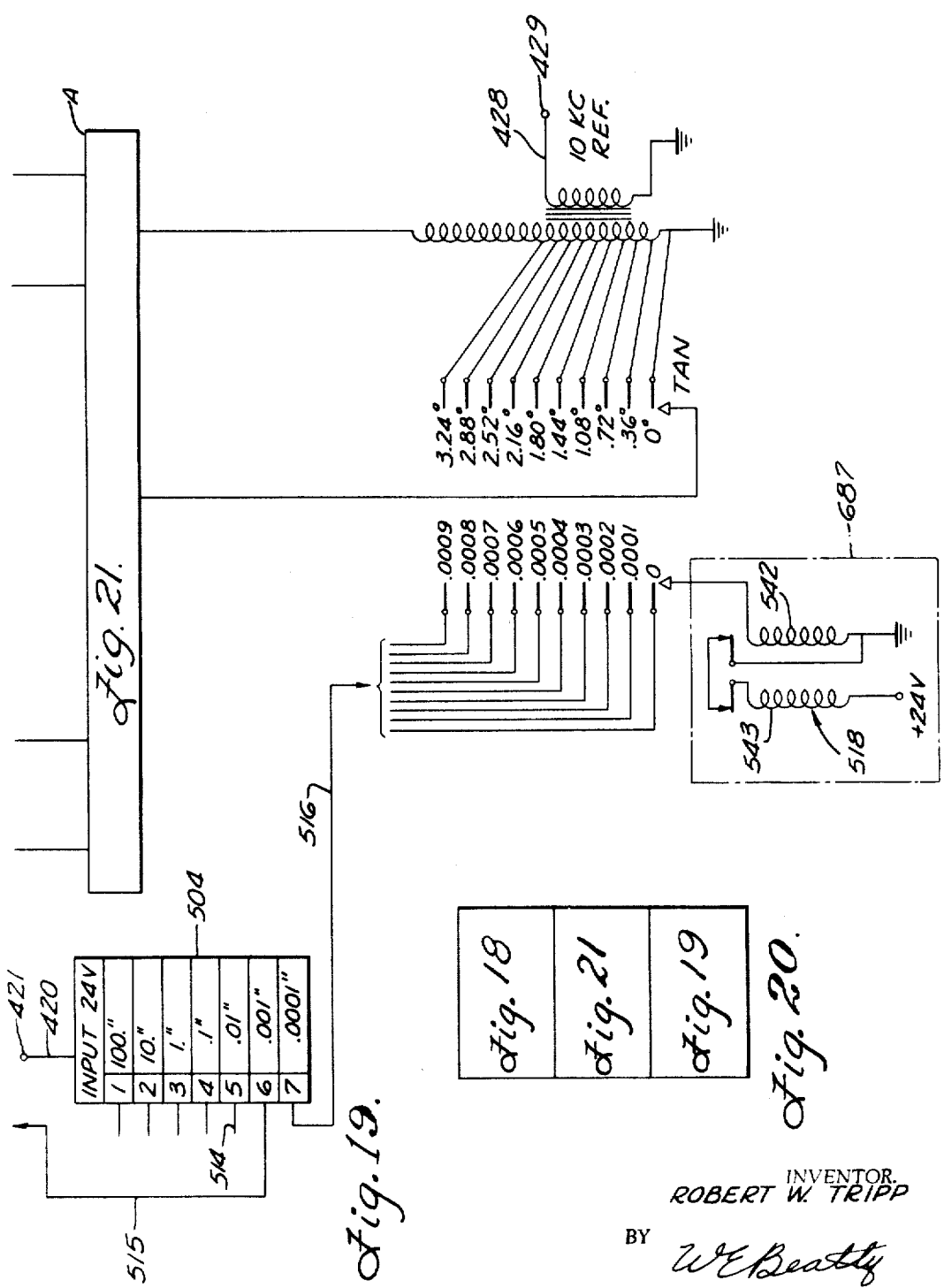

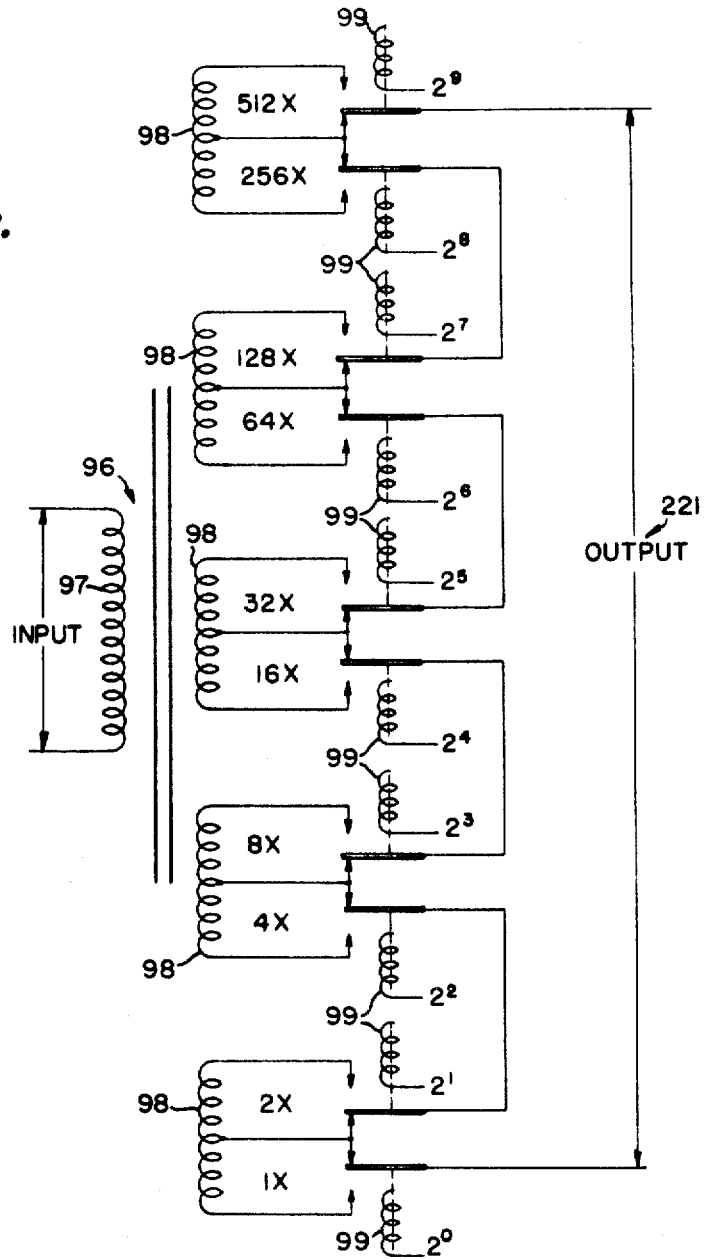

United States Patent Office 3,423,656
Patented Jan. 21, 1969

3,423,656
SPLINE INTERPOLATOR WITH INTERPOLATING POTENTIOMETERS
Robert W. Tripp, Eastchester, N.Y., assignor to Inductosyn Corporation, Carson City, Nev., a corporation of Nevada
Filed Dec. 6, 1963, Ser. No. 328,542
U.S. Cl. 318—18                    27 Claims
Int. Cl. H02p 7/68

ABSTRACT OF THE DISCLOSURE

The invention provides a generator of analog signals representative of a curve comprising digital input of starting coordinates of curve segment, digital-to-analog conversion means for supplying analog signals representative of the starting coordinates, differential means for modifying the analog signals to represent a continuous set of points along the curve segment, each of the differential means having a shaft input which is servo-controlled by one or more analog signals, one of the last mentioned analog signals for each of the servos being derived from the swinger of a potentiometer. The binary gear mechanisms 41 and 42 of Patent No. 2,902,887, Sept. 8, 1959 are eliminated and replaced by linear interpolating potentiometers.

---

The present invention relates to a Spline Interpolator with Interpolating Potentiometers, and is an improvement in the Interpolating System for Automatic Machine Tool Control described and claimed in application Ser. No. 622,397, filed Nov. 15, 1956, and in three divisions thereof, now patents as follows:

Patent No. 3,058,657, Oct. 16, 1962, Variable Speed Drive Interpolation System for Automatic Machine Control, hereafter referred to as Case A; Patent No. 2,902,-887, Sept. 8, 1959, Binary Gear Device, hereafter referred to as Case B; and Patent No. 3,066,868, Dec. 4, 1962, Interpolation Computing System for Automatic Tool Control, hereafter referred to as Case C. These patents and others referred to herein are assigned to the assignee of the present application.

In particular, the invention relates to a variable speed drive interpolation system for automatic machine control which will accept input data in digital form and control the motion of a tool relatively to a work piece along a straight path, or along a continuous curve instead of generating straight line segmental approximations as heretofore proposed, for example in the M.I.T. milling machine control. The tool may be either the cutting tool of a milling machine, lathe, profiler or the like, or it may be the scriber or stylus of a drafting or engraving machine for generating curves.

The objects of the present invention include the features of an improved variable speed drive for reducing the amount of input data required, eliminating much of the effort required for programming the portion of the computation carried out on a digital computer, and resolving the instruction to the machine elements into a plurality of grades of increments of which the fine increment is preferably handled by a highly accurate position-measuring transformer such as the "Inductosyn" as described in further detail later.

As compared to Cases A, B and C, an object of the invention is to simplify the apparatus required, avoid use of mechanical devices for performing mathematical operations, and provide apparatus wherein the correctness of the tool path is inherently checked, while generating or machining a continuous curve. This is accomplished by generating the curve by an interpolation method in which the curve is fitted between point pairs and goes through each point without errors of integration. The accuracy of the approximation to a spline fit depends upon the separation of the points and upon the nature of the curve as explained in further detail later. The amount of data required according to the invention can be reduced by selecting the distance between data points with due regard to the required curve shape and the permissible error. The use of the variable speed drive of this invention also makes it possible to maintain a constant cutting speed even though each cycle of the feed rate includes point pairs having different separations.

It is possible to obtain the required machine input data with certain relatively simple arithmetical operations. The specification develops the required mathematical equations. The only original data needed for the evaluation are the X and Y coordinates of a suitable number of points. When the equation of the curve is known, it is a very simple matter to compute the necessary input data to the machine, as will be hereinafter explained.

A particular advantage of the invention is that the machine can be stopped at any point of its sequence and be started again without loss of accuracy.

According to the invention, a curve is divided into segments, and the coordinates of each segment are taken as the sum of the coordinates of points along the chord between the point pairs for each segment and the distance from the chord to the curve, measured perpendicular to the chord. The invention is useful for continuously computing this sum in analog form from data of the segment and the chord and data of the required interpolation constants. A further object of the invention is to provide a variable speed drive useful in connection with the steps of continuously computing from such data the lengths of the perpendicular from the chord to the curve, resolving such perpendicular values into their components along the X and Y axes, adding such components to the corresponding components of the chord along such axes, and controlling the feed rates of the machine elements along those axes accordingly.

While the variable speed drive of this invention may be used for generating a straight line, or a succession of straight lines having different slopes, the invention is particularly useful for the generation of complex curves by generating successive curved segments. This involves the chord-to-tangent angle and the length of the chord for each segment and for the generation of continuous curves, it also involves preparing the instruction for the next segment while maintaining the instruction for a given segment with a quick shift from one instruction to the next. It is a particular object of the present invention to provide a variable speed drive useful for those purposes. Further features of the invention are to provide for adjusting the position of the required curve before starting, to provide for a separate introduction of cutter offset instruction, to provide a constant cutting rate independent of the length of each successive segment of the curve to be cut. A further feature is to provide for the generation of corners including means for stopping the feed rate drive until the new slope angle is established, while maintaining the cutter radius instruction active so that at the corner the machine will describe an arcuate path having a radius equal to the cutter radius whereby the cutter always remains in contact with the corner being cut. Provision is also made for zero offset.

*Cutter offset.*—Provision is made for computing the absolute value of the slope angle $\phi$ of the curve from the input values of the increments $\Delta X$ and $\Delta Y$, an adjustable tool radius input R being provided to resolve the tool radius R into the increments $X_R$ and $Y_R$ for addition to the other instructions pertinent to the X and Y axes. This is broadly described and claimed in U.S. application Ser. No. 561,769 filed Jan. 27, 1956 for "Tool Radius Correction Computer," as applied to two axes, and is described and claimed as applied to three axes in Ser. No. 608,357 filed Sept. 6, 1956 for "Three Dimensional Tool Radius Correction Computer." Use of this feature permits various cutters to be employed without altering the input program.

*Zero offset.*—Provision is made for locating the program zero as described with respect to the machine coordinates so that the part may be programmed in advance and the part located on the machine subsequently. The difference between the machine coordinate zero and the part coordinate zero is "zero offset." This is described and claimed in U.S. application Ser. No. 638,722, now Patent No. 2,950,427, filed Feb. 7, 1957 for "Zero Offset for Machine Tool Control."

*Sequence.*—Concerning the sequence of operation in relation to the program advance, the objects of the invention are to hold the inputs in the selected state from one command to another, change from one state to another at exactly the position desired, hold the digital input for a short time until the equipment is ready to accept it, hold the inputs energized independently of the storage circuits, utilize the storage circuits to hold the next data while current data is being used, and to provide a circuit which makes it possible to "read" the punched card or tape at a relatively slow rate and during times when the previous information is being held on the operating coils, while making it possible to change the state of the operating coils, and obtain the shaft speed called for by the input, very rapidly and at an accurately chosen time or under accurately chosen conditions.

The curve is divided into a plurality of successive segments, the length of these segments being chosen with due regard for the required accuracy as explained later.

In accordance with the present invention, each successive segment of a curve is generated from the values of (*a*) the differences between the coordinates of the end points of the segment, (*b*) the angle between the chord and the tangent at the cutting point, and (*c*) the departure H of the curve from the chord, measured perpendicularly to the chord from the cutting point on the curve. It is shown that the value of H is given by the equation:

$$H = \left[\beta_a - \alpha_b + \beta_a\left(\frac{S}{D}\right) - \alpha_b\left(1 - \frac{S}{D}\right)\right]\frac{S(D-S)}{D} \quad (1)$$

and that the value of the angle λ is given by the equation:

$$\tan \lambda = \frac{dH}{dS} = \beta_a\left(1 - \frac{3S_2}{D_2}\right) + \alpha_b\left[1 - 3\left(1 - \frac{S^2}{D}\right)\right] \quad (2)$$

In the above Equations 1 and 2, $\beta_a$ = Starting interpolation angle of segment
$\alpha_b$ = Ending interpolation angle of segment,
$\alpha_b = -\frac{1}{3}(\alpha_{N+1} + 2\beta_N)$, $\beta_a = -\frac{1}{3}(2\alpha_{N+1} + \beta_N)$ (3)

where $\beta_N$ is the angle between the chord and the tangent to the curve at the first data point N of the curve segment and $\alpha_{N+1}$ is the angle between the chord and the tangent to the curve at the second data point $N+1$ of the curve segment.

D = Chord distance between adjacent data points.
S = Distance measured along the chord to a perpendicular from the chord to the cutting point on the curve.

It is further shown that instantaneous values of the coordinates of points X', Y', on the path to be followed by the center of the cutter are given by the following equations which appear later as Equations 62 and 63:

$$X' = X_N + S\frac{\Delta X}{D} - H\frac{\Delta Y}{D} + X_R \quad (4)$$

$$Y' = Y_N + S\frac{\Delta Y}{D} + H\frac{\Delta X}{D} + Y_R \quad (5)$$

In Equations 62 and 63, $X_N$ = Abscissa of the first data point N
$\Delta X$ = Difference in abscissae between adjacent data points
$X_R$ = X component of cutter radius
$Y_N$ = Ordinate of the first data point
$\Delta Y$ = Difference in ordinates between adjacent data points
$Y_R$ = Y component of cutter radius It is also shown that the value of tan λ as given in Equation 2 is taken into account in computing the cutter offset components $X_R$ and $Y_R$.

A further feature of the invention is to provide a method of computing the necessary input values of α, β, ΔX and ΔY in digital form and continuously computing signal values of H (Equation 1) and $$\frac{H}{D}$$

and also tan λ (Equation 2) and from these signal values to continuously compute the terms included in Equations 62 and 63 and add the terms for each equation as indicated, and control the feed rate of the machine elements on coordinate X and Y axes accordingly.

It is shown that in the case where the equation of the curve is known, the values of α and β are readily determined, whereas, if the equation of the curve is not known, the values of α and β may be computed by analogy to a spline fit, from data of the points of preceding and succeeding segments of the curve.

The above objects are accomplished by employing a precision position measuring transformer to attain high precision, and by employing analog computers to provide continuous data of position, to drive servos which position the machine element relatively to the work piece to be cut.

While the invention will be described with reference to two orthogonal axes, referred to as the X and Y axes, with the Z axis used for positional control only, it will be apparent that the interpolation method and means herein described may be extended to apply also to a third axis Z at right angles to the plane of the X and Y axes.

There are several known mathematical interpolation methods by which an equation, or a series of equations, can be obtained, which will closely approximate any desired curve. In the preferred mathematical method herein described, the equations of the curve itself are not computed or required. Instead, the mathematical theory of stress and strain is employed to compute selected parameters of a spline fit to the required curve, or a very close approximation to such spline fit.

The selected parameters are computed for successive pairs of points along the desired curve as given, or taken sufficiently close together to insure the required accuracy of approximation to the desired curve. The computation for each pair of points is based upon the relative locations of prior and subsequent points along the curve.

The equations which are herein developed and employed to give effect to the location of prior and subsequent points in determining the path to be followed between each successive pair of points, are based upon the use of two prior and two subsequent points. It is to be understood, however, that the mathematical method is equally applicable to single prior and subsequent points or to three or more prior and subsequent points, and that the invention is therefore not limited to any particular number of prior and subsequent points.

The selected parameters to be used are computed on a digital computer which may be of any suitable type, and which is not claimed as part of the invention. These parameters are recorded by the digital-computer in any convenient form, such as punched cards or punched paper tape.

The computed parameters are employed in a combination of electrical, electronic and mechanical components to be described to cause the cutter or other tool of a milling machine or the like to reproduce the desired curve upon any desired number of work pieces.

In the illustrative embodiments herein described, the X and Y components of the perpendicular distance from the chord between any two points to successive points on the interpolated curve are computed in analog form and added to the successive X and Y components of the chord, to guide the cutter or other tool along a path which will reproduce the interpolated curve.

For further details of the invention reference may be made to the drawings wherein FIGS. 1, 2, 3, 4a to 4e and FIG. 5 are schematic figures illustrating a curve and its components involved in mathematical equations given later in connection with computing the segment of the curve from certain parameters of the curve, FIGS. 4a to 4e, being useful in connection with computing the starting and ending chord-to-tangent angles of the curve where the curve function is not known. FIG. 4a illustrates a spline fit through 6 points. FIGS. 4b to 4e illustrate the 3-point spline components of the curve in FIG. 4a.

FIG. 9 is a schematic diagram of the graphical representation of Equations 62 and 63.

FIG. 10 is a block diagram showing how FIGS. 11–16 are arranged for the complete schematic spline interpolator system of the present invention.

Figure 21:
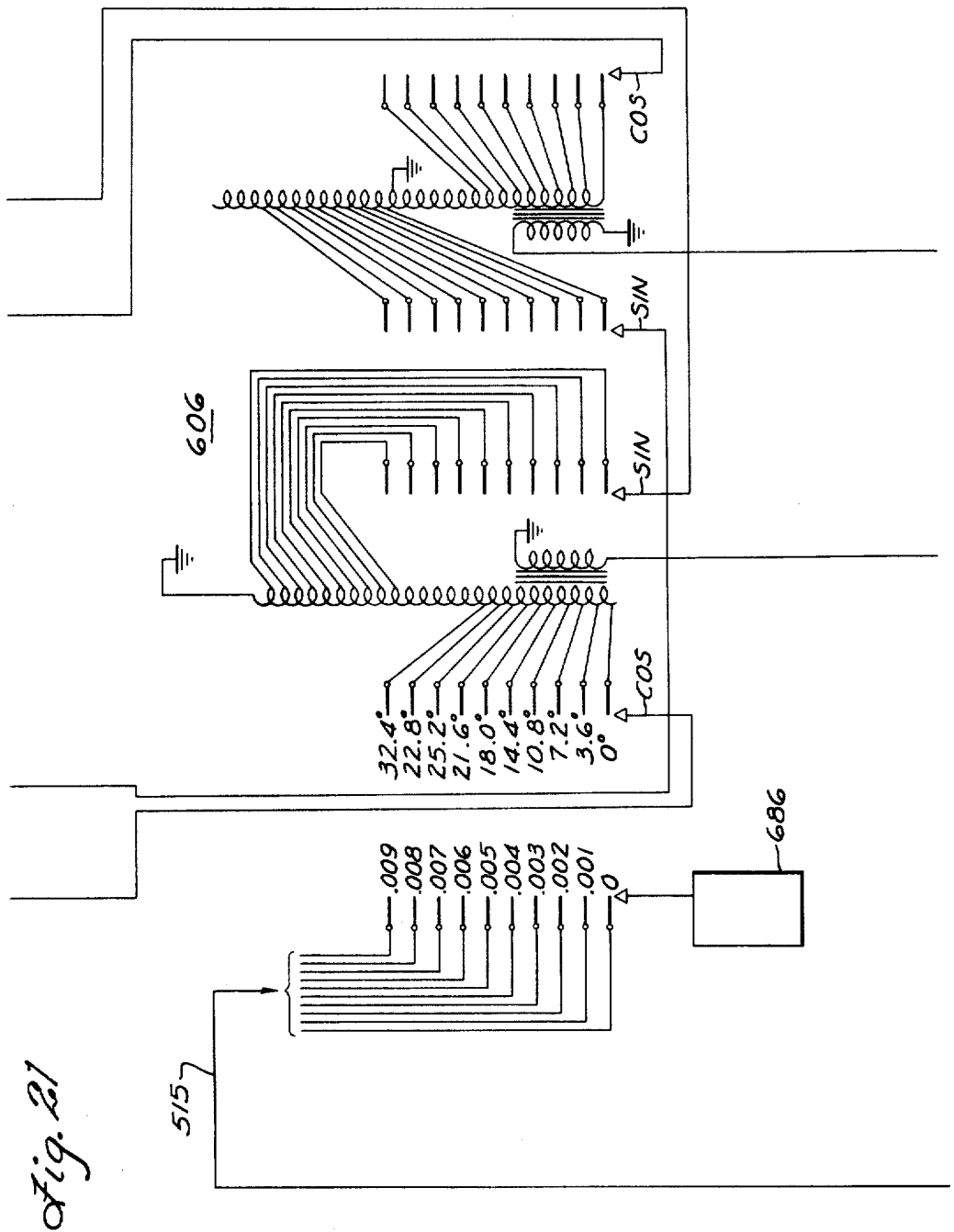

FIG. 20 is a block diagram showing how FIGS. 18, 19 and 21 fit together. FIGS. 18, 19 and 21 schematically show details of a typical digital-analog converter such as $X_1$ 413 in FIG. 11. FIG. 21 corresponds to block A, FIG. 19.

FIG. 22 is a diagram of the linear digital-to-analog converter and multiplier employed in the systems of FIGS. 11 to 16.

Figure 23:
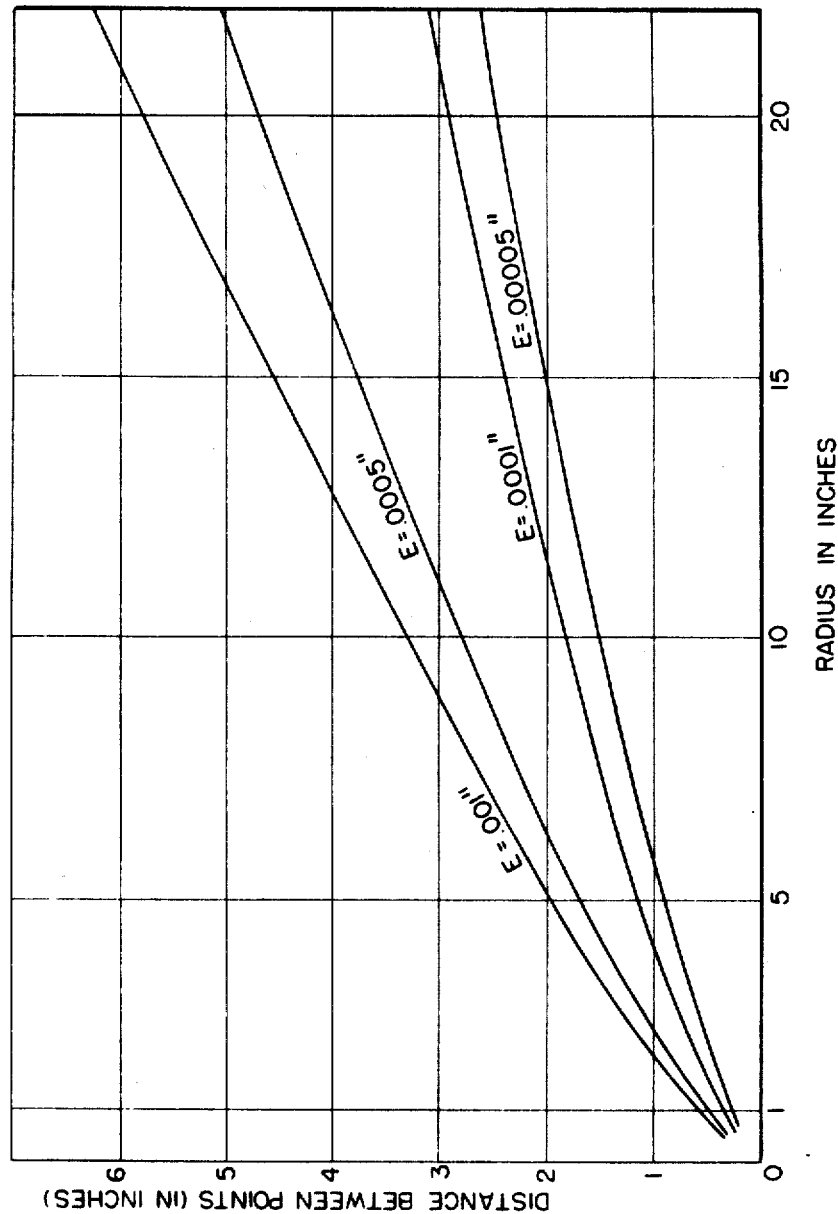

FIG. 23 is a graph illustrating the relation of the distance between data points to the departure of the generated curve from a circular arc.

The following is a list of the symbols used in this specification, with their definitions; as illustrated in FIGS. 1 to 9.

X′=Instantaneous value of the abscissa of the cutter center along the machine X axis
Y′=Instantaneous value of the ordinate of the cutter center along the machine Y axis
$X_N$=Abscissa along X axis of data point N
$Y_N$=Ordinate along Y axis of data point N
$X_p$=Abscissa of the cutting point along X axis
$Y_p$=Ordinate of the cutting point along Y axis
$X_R$=X component of cutter radius
$Y_R$=Y component of cutter radius
$\Delta X$=difference between the abscissae of adjacent data points
$\Delta Y$=difference between the ordinates of adjacent data points
$\Delta_1 X$=X component of H (see H below)
$\Delta_1 Y$=Y component of H (see H below)
H=departure of the curve from the chord D, measured perpendicular to D from the point P on the curve
H′=deflection of a beam anchored at point 1 and bent to pass through point 2. (See FIG. 2.)

D=chord distance between adjacent data points
C=constant
S=distance measured along the chord D
R=cutter radius
$\sigma$=slope angle between the chord D and the X axis
$\lambda$=angle between the chord and the tangent at the cutting point P
$\theta$=the angle between two successive chords
$\phi$=slope angle of the tangent at P
$\beta_N$=the angle between the chord of a curve segment N, N+1 and the tangent to the curve segment at N, or chord-to-tangent angle.
$\alpha_N$=the angle between the chord of a curve segment N−1, N and the tangent to the curve segment at K, or, chord-to-tangent angle.
$\beta=\beta_a$ as applied to Equations 1 and 2. (See FIG. 3.)
$\alpha=\alpha_b$ for FIGURE 4, $\beta=\beta_a=\beta_{a3}$ and $\alpha=\alpha_b=\alpha_{b4}$
$\Delta_1 X = (\tan \lambda)\Delta Y$
$\Delta_1 Y = (\tan \lambda)\Delta X$
See FIG. 6.

SIGN CONVENTIONS

The sign conventions employed in the following discussion are:

(1) Angles are positive when measured counter-clockwise.

(2) An angle between a chord and a tangent is measured from the chord to the tangent.

(3) An angle between two chords is measured from the extension of the first chord to the second chord.

(4) Distances along chord are taken as positive in the direction of motion. Distances normal to chords are taken as positive to the left of the direction of motion.

(5) Lengths of chords are taken as positive.

MATHEMATICS OF THE INTERPOLATION METHOD

Consideration will now be given to the mathematics of the interpolation method, first for the general case where the equation of the curve is not known, and then for the case where the equation of the curve is given.

*Equation of the curve not known.*—The general case is the one in which the equation of the curve is not known. In this case, the digital computer computes the lengths D of the chords and the angles $\theta$ from the values of X and Y between the chords. Using Equations 35, 36, 37 and 38 to find values of $C_3$ and $C_4$, it then computes the required values of the chord-to-tangent angles $\alpha$ and $\beta$ from Equations 33 and 34. These equations are explained later.

Figure 1:
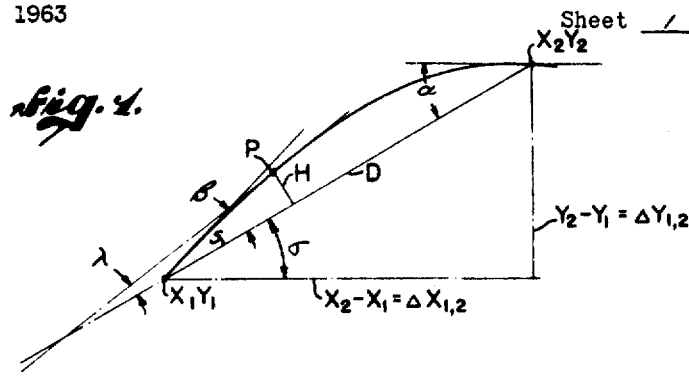
Figure 2:
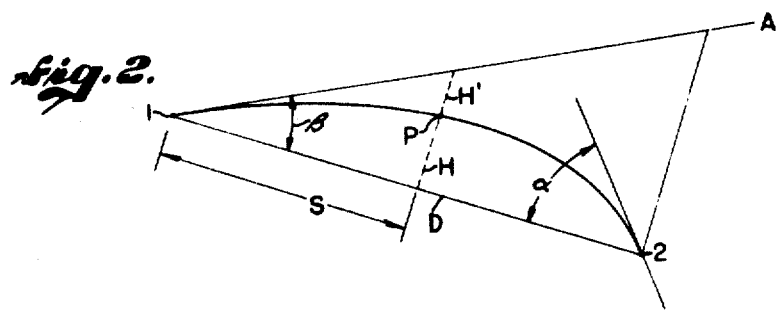

Equations 1 and 2 are those of the required parameters of a close approximation to the curve which would be produced by a spline, or a uniform flexible strip which is caused to pass through the given points on the curve. The use of such a spline or strip is well known in the drafting and layout arts. The validity of the equations may be demonstrated in the following way: If a beam 1, 2 (FIG. 2), fixed at the point 2, is bent by a force normal to the beam at point 1 so that the beam after bending passes through the point 1, its behaviour may be analyzed in the following way: there is set up a bending moment which varies along the beam, its magnitude at any point P being proportional to the distance, S, from the point 1. This is a well-known principle, fundamental in the theory of stress and strain, and presented in any treatise on strength of materials. In FIG. 2, and, indeed, in the usual treatment of beams, it is considered immaterial to the discussion whether the distances involved are measured along the tangent 1, A, along the chord 1, 2 or along the bent beam 1, P, 2 itself, since the angle A, 1, 2 is considered to be so small that the relationship angle-sine-tangent is a very close approximation. In the operation of the invention herein described, it is necessary that the points along the curve to be cut be taken sufficiently close together that this relationship is true without sensible error. This is not a tight restriction since, for reasons of accuracy, points would normally be taken sufficiently close together that this is the case.

The bending moment of the beam which is proportional in magnitude to the distance S along the beam (or along the tangent, or the chord), causes a change in the slope of the beam such that the rate of change of slope is proportional to said bending moment. From the principles of analytical geometry it is known that the slope of a curve $H=f(S)$ is given by the first derivative of H with respect to S, and the rate of change of slope is given by the second derivative of H with respect to S, or in common nomenclature, and with the notation of FIG. 2:

$$H'=f(S) \quad (6)$$

$$\frac{dH'}{dS}=f'(S)=\text{slope} \quad (7)$$

$$\frac{d^2H'}{dS^2}=f''(S)=\text{rate of change} \quad (8)$$

But it is known that the rate of change of slope is proportional to S, hence we may write $$\frac{d^2H'}{dS^2}=k_1 S \quad (9)$$

and if a double integration is performed, there results the expression $$H'=k_2 S^3 + C_1 S + C_2 \quad (10)$$

where $C_1$ and $C_2$ are constants of integration, $C_1$ representing the initial slope and $C_2$ the initial deflection of the beam. In the situation represented in FIG. 2, both are zero, hence $$H'=kS^3 \quad (11)$$

To determine the value of $k$, we note in FIG. 2 that, when $S=D$, then $H'=D \tan \beta = D\beta$ by the small-angle approximation. Substituting these values in Equation 11 gives $$k=\frac{\beta}{D^2} \quad (12)$$

$$H'=S^3 \frac{\beta}{D^2} \quad (13)$$

We are interested, however, in the value of H, or departure of the curve from the chord. Referring to FIG. 2 and using the small-angle approximation:

$$(H+H')=S\beta \quad (14)$$

and, since $$H=(H+H')-H' \quad (15)$$

from Equations 13, 14 and 15, we have:

$$H=S\beta-S^3\frac{\beta}{D^2}$$

which may be written $$H\left(S-\frac{S^3}{D^2}\right)\beta \quad (17)$$

and the slope of the curve with respect to the chord may be obtained by taking the derivative of (17) with respect to S, obtaining $$\frac{dH}{dS}=\tan \lambda =\left(1-\frac{3S^2}{D^2}\right)\beta \quad (18)$$

Now, at the point (2), $S=D$, and substitution in (18) gives $$\alpha=\frac{dH}{dS}=-2\beta \quad (19)$$

where $\alpha$ is the chord-to-tangent angle at the point 2.

In the case of the present invention, the beam in question (the assumed spline) is not fixed at either end of a given chord, so that the above analysis is insufficient to completely describe the case. The case may be described, however, to a close degree of approximation by considering a set of six (6) points of constraint, two to the left of and two to the right of the chord segment being considered. If this is done, the condition shown in FIGS. 4a to 4e exists, where the symbolism is consistent with that adopted in the above discussion.

In accordance with the principle of superposition, there is a unique set of four 3-point beams which determines the shape of the spline through six points. As will be explained in more detail presently, the chord-to-tangent angles $\alpha_b$ and $\beta_a$ of the 3-point beams are proportional to the chord lengths, and depend in magnitude upon the angles $\theta$ between successive chords, since, at each point, the sum of the $\alpha$ components plus the sum of the $\beta$ components is equal to the chord-to-chord angle $\theta$. (See Equation 28.) The sum of $\alpha_b$ and $\beta_a$ at the center of each 3-point is an angle $\theta'$, which in general is not equal to $\theta$, and need not be determined.

FIGS. 4b to 4e shows the component 3-point splines used to compute the 6-point spline 4a. The curvature is zero at the end points of the four 3-point beams. Hence, at either side of the midpoint of each 3-point beam, the chord-to-tangent angle is twice that the end of the beam, but is of opposite sign. (See Equation 19.)

The actual values of the chord-to-tangent angles at the chord ends are the algebraic sums of the component values illustrated in FIGS. 4b to 4e, that is to say $$\beta_N=\beta_{aN}+\beta_{bN} \cdot \alpha_N=\alpha_{aN}+\alpha_{bN} \quad (20)$$

From the theory of beam flexure, it may be shown that $$\frac{-\alpha_{aN}}{\beta_{bN}}=\frac{D_{N-1,N}}{D_{N,N+1}} \quad (21)$$

and in particular, for a chord 3, 4; we have $$\frac{-\alpha_{a3}}{\beta_{b3}}=\frac{D_{2,3}}{D_{3,4}} \quad (22)$$

This may be written $$\frac{-\alpha_{a3}}{\beta_{b3}}=\frac{D_{2,3}C_3}{D_{3,4}C_3} \quad (23)$$

where $C_3$ is a proportionality constant. If $\alpha_{a3}$ is proportional to $D_{2,3}$ as indicated in Equation 23, then it can be stated that $\alpha_{a3}=D_{2,3}C_3$, and the equations for the component angles are as follows:

$$\alpha_{a3}=D_{2,3}C_3 \quad (24)$$

$$-\beta_{b3}=D_{3,4}C_3 \quad (25)$$

$$\alpha_{a4}=D_{3,4}C_4 \quad (26)$$

$$-\beta_{b2}=D_{2,3}C_2 \quad (27)$$

Now, the angles between the chords can be seen by inspection to be equal to the sum of the actual angles $\alpha_N$ and $\beta_N$ at a given point, and since, by the principle of superposition, the angles $\alpha_N$ and $\beta_N$ at a point are the sums of the respective components of these angles $\alpha_{aN}+\alpha_{bN}$ and $\beta_{aN}+\beta_{bN}$, we may write, for the angles between the two chords at the points 3

$$\theta_3=\alpha_{a3}+\alpha_{b3}-\beta_{a3}-\alpha_{b3} \quad (28)$$

where the algebraic signs have been appropriately chosen for the directions in which the angles are indicated. Now, from Equation 19

$$\beta_{a3}=-\frac{\alpha_{a4}}{2} \quad (29)$$

$$\alpha_{b3}=-\frac{\beta_{b2}}{2} \quad (30)$$

And, substituting in 28 from Equations 24, 25, 26, 27, 29 and 30 we obtain $$\theta_3=D_{2,3}\left(C_3+\frac{C_2}{2}\right)+D_{3,4}\left(C_3+\frac{C_4}{2}\right) \quad (31)$$

Similarly, for the angle between the chords at the point 4

$$\theta_4=D_{3,4}\left(C_4+\frac{C_3}{2}\right)+D_{4,5}\left(C_4+\frac{C_5}{2}\right) \quad (32)$$

and the values of $\beta_{a3}$ and $\alpha_{b4}$ required for use in Equations 1 and 2 for the same chord are seen to be given by $$\beta_{a3} = -D_{3,4}\frac{C_4}{2} \tag{33}$$

$$\alpha_{b4} = D_{3,4}\frac{C_3}{2} \tag{34}$$

In order to obtain the values of the constants of proportionality, C, for the chord 3, 4, it is necessary to set up the equations for $\theta_2$, $\theta_3$, $\theta_4$ and $\theta_5$, in simultaneous form, as follows:

$$\theta_2 = D_{1,2}C_2 + D_{2,3}\left(C_2 + \frac{C_3}{2}\right) \tag{35}$$

$$\theta_3 = D_{2,3}\left(C_3 + \frac{C_2}{2}\right) + D_{3,4}\left(C_3 + \frac{C_4}{2}\right) \tag{36}$$

$$\theta_4 = D_{3,4}\left(C_4 + \frac{C_3}{2}\right) + D_{4,5}\left(C_4 + \frac{C_5}{2}\right) \tag{37}$$

$$\theta_5 = D_{4,5}\left(C_5 + \frac{C_4}{2}\right) + D_{5,6}C_5 \tag{38}$$

Thus, information pertaining to all of the six points of constraint, is included in Equation 1 which is the ordinate of the curve between the points 3 and 4, referred to the chord as the X axis.

Equation 1 is derived from Equation 17 as follows:

$$H_a = \left(S - \frac{S^3}{D^2}\right)\beta_a$$

Figure 3:
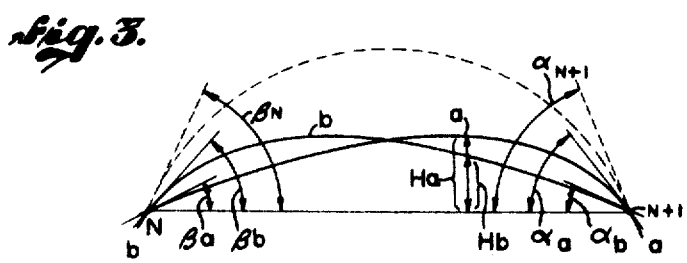

Referring to FIG. 3, $H_a$ is the departure from the chord of the curve ($a$) defined by $\beta_a$.

$$H_b = -\left[(D-S) - \frac{(D-S)^3}{D^2}\right]\alpha_b$$

where $H_b$ is the departure from the chord of the curve ($b$) defined by $\alpha_a$.

The resultant curve is $$H_a + H_b - (D^2 S - S^3)\frac{\beta_a}{D^2} - (2D^2 S - 3DS^2 + S^3)\frac{\alpha_b}{D^2}$$

The total offset $H_a + H_b$ is equal to H $$H = S(D-S)(D+S)\frac{\beta_a}{D^2} - S(D-S)(2D-S)\frac{\alpha_b}{D^2}$$

$$= \frac{S(D-S)}{D}\left[\left(\frac{D+S}{D}\right)\beta_a - \left(\frac{2D-S}{D}\right)\alpha_b\right]$$

$$= \frac{S(D-S)}{D}\left[\left(1+\frac{S}{D}\right)\beta_a - \left(2-\frac{S}{D}\right)\alpha_b\right]$$

$$= \frac{S(D-S)}{D}\left[\beta_a - \alpha_b + \beta_a\left(\frac{S}{D}\right) - \alpha_b\left(1-\frac{S}{D}\right)\right]$$

which is identical with Equation 1.

Equation 2 is similarly derived from Equation 18.

$$\lambda_a = \left(1 - \frac{3S^2}{D^2}\right)\beta_a$$

where $\lambda_a$ is the slope of the curve ($a$) and $$\lambda_b = \left(1 - \frac{3(D-S)^2}{D^2}\right)\alpha_b$$

The total angle $\lambda$ is equal to $\lambda_a + \lambda_b$ $$\lambda = \left(1 - \frac{3S^2}{D^2}\right)\beta_a + \left[1 - 3\left(1 - \frac{S}{D}\right)^2\right]\alpha_b$$

which is equivalent to Equation 2.

Information for the curve to be reproduced may be given by (1) a table of the X and Y coordinates of the points through which the curve must pass, (2) a table of the X and Y coordinates and the slope of the curve at each point, (3) an equation of the required curve (or by a series of equations for various parts of the curve), and (4) an actual sample of the part to be reproduced, or a pattern of any suitable scale.

(1) If a table of the X and Y coordinates of the curve is given, no decision as to the points to be used needs to be made. The given points are used and the interpolation method described gives a smooth curve going through the points.

(2) If, in addition to the coordinates, the slope of the curve at each point is given the values of the parameters alpha and beta can be determined very readily.

(3) If an equation is given, a decision must be made as to how close together the points must be. This can be determined mathematically. However, once the spacing of the points has been determined, the values of $\Delta X$ and $\Delta Y$ can be easily calculated from the equation and alpha and beta may be readily determined without using the interpolation method described.

(4) If a sample or pattern is supplied, the spacing of the points will have to be determined, but this can probably be done by inspection, perhaps with the aid of a spherometer. The coordinates of the chosen points can then be measured and fed to the digital computer.

DETERMINATION OF COEFFICIENTS FOR EQUATION 1 WHEN TANGENTS TO THE CURVE TO BE APPROXIMATED ARE AVAILABLE FROM THE EQUATION OF THAT CURVE, OR ARE INCLUDED IN THE GIVEN DATA

From Equations 33 and 34, it follows immediately that the coefficients $\alpha_b$ and $\beta_a$ can be found when the angles $\alpha_{N+1}$ and $\beta_N$ are specified, by use of the following equations:

$$\alpha_b = -\frac{1}{3}(\alpha_{N+1} + 2\beta_N) \tag{39}$$

$$\beta_a = -\frac{1}{3}(2\alpha_{N+1} + \beta_N) \tag{40}$$

These equations, however, are based upon a derivation which assumed that angles were sufficiently small to be taken equal to their tangents, and the curve represented by Equation 1 will have the required initial and terminal slopes only if this assumption is valid.

However, if the coefficients $\alpha_b$ and $\beta_a$ are found by use of the following pair of equations, the initial and terminal slopes of the curve represented by Equation 1 will be exactly those desired.

$$\alpha_b = -\frac{1}{3}[\tan \alpha_{N+1} + 2 \tan \beta_N] \tag{41}$$

$$\beta_a = -\frac{1}{3}[2 \tan \alpha_{N+1} + \tan \beta_N] \tag{42}$$

This is easily demonstrated by evaluation of tan $\lambda$ (see Equation 2) with these values for $\alpha_b$ and $\beta_a$, for $S=0$ and $S=D$. It should be noted that $\alpha_b$ and $\beta_a$ are no longer actually angles if they are found by use of the second set of equations given above. When the equation of the curve is given, and if a digital computer has already been programmed to carry out the computation previously outlined, it may be preferable to use the equation of the curve to determine the $x$ and $y$ coordinates of a suitable number of points and to feed these points into the digital computer.

STRAIGHT LINE

When any portion of the path to be generated is a straight line, the values of alpha and beta for segments along the straight line portion are zero and the values of $\Delta X$ and $\Delta Y$ can be computed on a desk calculator and hand punched into tape at the appropriate position along the tape.

END POINTS

As previously stated, the equations which have been developed for the parameters of the spline fit to each segment of the curve are based upon using the points defining two prior and two subsequent segments. For the first segment of the curve there are no prior segments, and for the second segment only one. Similarly, at the end of the curve, there are no subsequent segments for the last segment, and only one for the penultimate segment. Several methods of overcoming this difficulty are available and a preferred method will be described.

Where no additional data is given, the spline is assumed to be open-ended and to have zero curvature at end point.

The parameters of the first two and last two segments may be computed using Equations 35, 36, 37 and 38 to obtain a value for $C_2$ to be used in Equations 33 and 34 for the parameters of the first two segments, where $C_1$ is zero and remembering that $C_3$ is normally computed for use on the third segment. Similarly, a value for $C_5$ is obtained for computing the parameters of the last two segments, where $C_6$ is zero and remembering that $C_4$ is normally computed for the third segment from the end. Equations 33 and 34 rewritten with new subscripts for this computation are as follows:

| First segment | Second segment | Penultimate segment | Last segment | |
|---|---|---|---|---|
| $\beta_{a1} = -D_{1,2} \frac{C_2}{2}$ | $\beta_{a2} = -D_{2,3} \frac{C_3}{2}$ | $\beta_{a4} = -D_{4,5} \frac{C_5}{2}$ | $\beta_{a5} = -D_{5,6} \frac{C_6}{2}$ | (43) |
| $\alpha_{b2} = D_{1,2} \frac{C_1}{2}$ | $\alpha_{b3} = D_{2,3} \frac{C_2}{2}$ | $\alpha_{b5} = D_{4,5} \frac{C_4}{2}$ | $\alpha_{b6} = D_{5,6} \frac{C_5}{2}$ | (44) |

Since $C_1$ for the first two segments, and $C_6$ for the last two segments are zero, the angles $\alpha_{b2}$ and $\beta_{a5}$ are also zero. H and $\lambda$ for these initial and terminal segments are evaluated by Equations 1 and 2, using the appropriate values of $\alpha$ and $\beta$ as tabulated above.

For the case in which the tangent at one end of the spline is known, the following approach can be taken: If we examine the three-point beam of FIG. 4b, we see that by referring to Equation 21 we have: $\alpha/\beta = D_{1,2}/D_{2,3}$. As the distance $D_{1,2}$ is shortened, the angle $\alpha$ decreases. In the extreme, when $D_{1,2}=0$, $\alpha$ becomes zero and the tangent to the curve at point 2 lies along the chord $D_{1,2}$. If the direction of chord $D_{1,2}$ is chosen as the known tangent at the end of the spline, and if the coordinate increments between points 1 and 2 are chosen to be zero, this special case can be handled by the general method previously described.

ACCURACY

The approximate spline fit interpolation herein discussed is based on the assumption that points remote from the curve segment under consideration have no effect on the shape of the segment. This not being strictly true, there will be some error in the interpolation. Another source of error is the assumption that angles are equal to their tangents and sines. By choosing coordinate points close enough together, however, a six point fit will provide sufficient interpolation accuracy for most problems. It is of course possible to use more than six (6) points to improve accuracy, and the system herein described is not limited in principle to six points. It is possible, however, to improve accuracy without using more points.

ERROR IN COMPUTATION OF $\alpha$ AND $\beta$ AND METHOD OF CORRECTION

At each of the specified points through which the generated curve is to pass, the angle $\theta_N$ between the chords should equal the sum of the chord-to-tangent angles $\alpha_N$ and $\beta_N$ at that point. The values of these angles in terms of the coefficients already computed may be obtained by solution of Equations 29, 30, 39 and 40, and are $$\alpha_N = -2\beta_{aN-1} + \alpha_{bN}\beta_N = -2\alpha_{bN+1} + \beta_{aN} \quad (45)$$

where N−1, N and N+1 identify any three consecutive points. If the sum of these two chord-to-tangent angles is not equal to the angle between chords, then the error $$\eta_N = \beta_N - \alpha_N + \theta_N \quad (46)$$

may be removed by computing, for each point, the adjusted angles $$\alpha'_N = \alpha_N\left(1 - \frac{\eta N}{\beta_N - \alpha_N}\right) \beta'_N = \beta_N\left(1 - \frac{\eta N}{\beta_N - \alpha_N}\right) \quad (47)$$

The adjusted coefficients for use in Equations 1 and 2 are then computed from Equation 3.

The correction just described will assure smoothness of the generated curve if the angles involved are sufficiently small to be assumed equal to their tangents. If this assumption is not valid, the required smoothness may be attained by using the tangents of the angles in Equation 41 and 42, instead of the angles themselves, in Equations 39 and 40. These computations are programmed for and performed by the digital computer.

TOOL RADIUS CORRECTION COMPUTER

Figure 5:
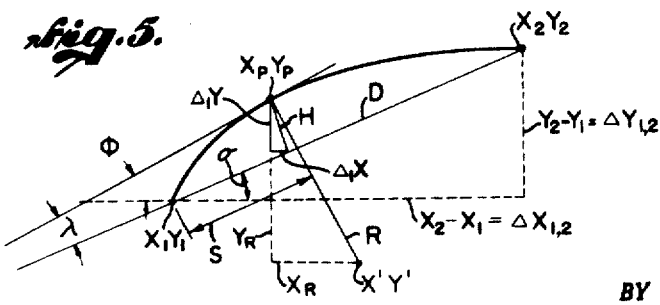

Referring to FIG. 5, a curve connecting the points $X_1Y_1$ and $X_2Y_2$ is shown, the connecting chord having length D. If the cutter which is to be used for the cutting operation has a radius R, then its center should be at the point X'Y', in order to cut tangent to the curve at the point $X_pY_p$. The components of the chord D in the machine coordinate system are $\Delta X_{1,2}$ and $\Delta Y_{1,2}$.

The instantaneous location of the cutter center is determined in the following way:

The machine coordinates of the cutter center for cutting tangent to a given instantaneous cutting point P, along the curve, are given by $$X' = X_p + X_R \quad (48)$$
$$Y' = Y_p + Y_R \quad (49)$$

where $X_p$ and $Y_p$ are the machine coordinates of the cutting point, and $X_R$ and $Y_R$ are the components in the machine coordinates of the cutter radius R.

$X_p$ and $Y_p$ may be expressed by the equations $$X_p = X_1 + S \cos \sigma - H \sin \sigma \quad (50)$$
$$Y_p = Y_1 + S \sin \sigma + H \cos \sigma \quad (51)$$

where $\sigma$ is the angle made by the chord D with the X=axis of the machine coordinate system. The values of $X_R$ and $Y_R$ are given by $$X_R = R \sin \phi \quad (52)$$
$$Y_R = R \cos \phi \quad (53)$$

The angle made by the tangent to the required curve with the direction of the chord is $\lambda$, and the slope of the required curve in the machine coordinate system is the sum of the angles $\lambda$ and $\sigma$. By the rule for the functions of the sum of two angles, we can write $$\sin \phi = \sin \sigma \cos \lambda + \cos \sigma \sin \lambda \quad (54)$$
$$\cos \phi = \cos \sigma \cos \lambda - \sin \sigma \sin \lambda \quad (55)$$

which may be written $$\sin \phi = \cos \lambda (\sin \sigma + \cos \sigma \tan \lambda) \quad (56)$$
$$\cos \phi = \cos \lambda (\cos \sigma - \sin \sigma \tan \lambda) \quad (57)$$

Now by inspection of FIG. 5, it is seen that $$\sin \sigma = \frac{\Delta Y}{D} \quad (58)$$

$$\cos \sigma = \frac{\Delta X}{D} \quad (59)$$

and tan $\lambda$ is expressed in Equation 2.

Therefore the following expressions can be derived by substitution $$\sin \phi = \frac{\cos \lambda}{D}(\Delta Y + \Delta X \tan \lambda) \quad (60)$$

$$\cos \phi = \frac{\cos \lambda}{D}(\Delta X + \Delta Y \tan \lambda) \quad (61)$$

$$X' = X_1 + S\frac{\Delta X}{D} - H\frac{\Delta Y}{D} + X_R \quad (62)$$

$$Y' = Y_1 + S\frac{\Delta Y}{D} + H\frac{\Delta X}{D} + Y_R \quad (63)$$

DISTANCE BETWEEN POINTS

Using the method and apparatus of the invention, the error between the curve generated by the machine and any given function will depend upon (1) the nature of the function, and (2) the separation between the chosen points. FIG. 23 is a graph showing the accuracy of the fit attainable in the case of a circular arc. In this figure, curves are presented for four different accuracies or tolerances, namely, .001″, .0005″, .0001″ and .00005″, between radius of curvature $r$, and distance between points $D$, both in inches. It can be shown that the maximum departure from a circular path is $$E = \frac{8r^2 - D^2 - r}{4\sqrt{4r^2 - D^2}} \quad (64)$$

and FIG. 23 is a plot of this equation for the accuracies shown.

APPLICATION OF EQUATIONS TO THE MACHINE CONTROL SYSTEM

In the following discussion, the application of the pertinent equations to the X-axis only is described, the application to the Y-axis being similar and clearly revealed in the accompanying diagrams.

In the present invention, as well as in the former cases referred to above, the instantaneous values of the coordinates of points $X'$, $Y'$ on the path to be followed by the center of the cutter are given by the following equations which appear as Equations 62 and 63.

$$X' = X_1 + S\frac{\Delta X}{D} - H\frac{\Delta Y}{D} + X_R \quad (62)$$

$$Y' = Y_1 + S\frac{\Delta Y}{D} + H\frac{\Delta X}{D} + Y_R \quad (63)$$

In the above equations, the terms are added algebraically.

Graphical representation of the above equations appears in FIG. 9 hereof which corresponds to FIG. 5 with the addition of a showing of the coordinate axes as a reference point, with the addition of the tool and the components of the tool radius to the point of tangency with the curve, and with the omission of certain interpolation symbols.

FIG. 9 is a schematic showing of a typical segment of a curve to be generated, the present invention providing position signals representative of the following items; namely, (Item 1) the position of the start of the curve segment in relation to a reference point, the X component of which is represented at $X_1$, (Item 2) the coordinate components of the chord length $D$ to the foot of the perpendicular to the point of tangency with the tool, (Item 3) the coordinate components of the perpendicular $H$ to a point tangent with the tool periphery; namely, the offset of the curve from its chord and, (Item 4) the components of the tool radius.

The system of the present invention performs the same function as in the prior cases referred to above, differing in detail in several respects as noted below.

In general, an object of the present invention is to provide signals corresponding to certain of the components of the above equations in the electrical form, instead of in mechanical form as a shaft position, as heretofore, and to avoid the use of gears for producing the signals $$\frac{S}{D}\Delta X \text{ and } \frac{S}{D}\Delta Y$$

and also to provide an improved control providing continuity of analog signals for successive curve segments, a typical one of which is illustrated in FIG. 9, derived from successive bits of digital input data representative of position. This will be dealt with more particularly in connection with signals represented by each of the four terms of Equation 62 for $X'$ which is typical of the terms of Equation 63.

In the former cases, the signal corresponding to $X_1$ was introduced by a servomotor to a binary gear mechanism appearing in the output thereof as a signal in the shaft. According to the present invention, the signal $X_1$ is produced as an electrical signal and is utilized at a different point in the system; namely, after the addition of the other three signal components.

Patent Cases "A" and "C" show binary gear mechanisms pertaining to coordinate axes X and Y, and acting as mechanical multipliers with a rotary input of a shaft and electrical inputs $\Delta X$ and $\Delta Y$ for linearly interpolating the voltages $\Delta X$ and $\Delta Y$ through one cycle, these binary gear mechanisms having shaft outputs respectively $$\frac{S}{D}\Delta X \text{ and } \frac{S}{D}\Delta Y$$

where $S$ and $D$, as well as other symbols used herein, are defined above. According to the present invention, these binary gear mechanisms are replaced by rotary potentiometers 401 and 402 acting as multipliers, with shaft and electrical inputs for linearly interpolating the voltages $\Delta X$ and $\Delta Y$ through one cycle, producing respectively the outputs $$\frac{S}{D}\Delta X \text{ and } \frac{S}{D}\Delta Y$$

as electrical signals. These potentiometers each include a circular impedance having terminals at opposite points, one half revolution of the shaft corresponding to one cycle of the system, and to chord length $D$, with a switch such as 407 for reversing the electrical input connections each half revolution of the shaft, which avoids the necessity for having the wiper, or movable element of the potentiometer step back to the starting point when the end of a segment has been reached and a new one is started. This contributes to an improvement in the continuous operation over the range of several segments of the curve, as the switching takes place at the start of the next curve segment when the values of signals corresponding to the second and third terms in the above equations are zero. Account is taken of the first and fourth terms for continuous operation, as described later.

According to the invention, the tool radius components $X_R$ and $Y_R$ are derived as before from resolver 20 which is operated to the angle $\phi$ as shown. Formerly, these tool radius components were produced as shaft instructions for addition to the instructions in other shafts, whereas, according to the present invention, these tool radius components in electrical form are added to electrical signals representing the second and third terms in the above equations, the components $\Delta_1 X$ and $\Delta_1 Y$, as appears in FIG. 9 hereof, corresponding respectively to the third term in the above equations.

Having described in general the improved manner in which the components in the above equations are generated and utilized, a further general description will now be given of the improved procedure for continuous operation. This was described above in connection with the second and third terms in the above equations, wherein it was pointed out that means are provided for switching at the end of one cycle when the values of the signals corresponding to the third term are zero and the value of $X_1 + S\Delta X/D$ for the end of one cycle, where $S/D=1$, is equal to $X_1 + \Delta X$, which is equal to $X_1$ for the start of the next cycle where $S$ and consequently $S\Delta X/D = 0$. The value of $\Delta X$ for any cycle is the difference between $X_1$ for that cycle and $X_1$ for the next succeeding cycle. It remains to deal with the manner in which the first and fourth terms of the above equations are dealt with for continuous operation.

Each axis of the machine is provided with a machine servomotor each having an input from a pair of control servomotors alternately active. The active control servomotor has an input of the last three terms of the above equation which includes the tool radius component $X_R$, $Y_R$, the alternate control servomotor being also supplied with the tool radius component so that this instruction is present in this alternate control servomotor at the time that it becomes active, receiving the next bit of instruction according to the second and third terms of the above equations. To the output of one control servomotor is added an instruction of the first term of the above equation, the next bit of instruction thereof being added to the alternate control servomotor. The instruction of the first of the above equations, in analog form, is derived from a pair of digital-analog converters which alternately receive successive bits of input information of $X_1$ and $Y_1$, and convert it into an analog signal in electrical form for addition to the outputs of the control servomotors.

Another object of the invention is to translate successive digital signals representative of position into a continuous analog signal. This is accomplished by providing digital-analog converters acting as stores, and successively utilizing the bits previously stored.

A further object of the invention is to provide a system requiring less precise mechanism for generated signals of $\Delta X$ and $\Delta Y$ than heretofore.

This is accomplished by providing a new input of position for the start of each segment of the curve, whereby there is no accumulation of $\Delta X$ and $\Delta Y$.

The prior system had an initial input of position. All subsequent starting points for new curve segments were obtained by adding the $\Delta X$ and $\Delta Y$ components successively.

As there is no accumulation of $\Delta X$ and $\Delta Y$ according to the present invention, this permits a less precise mechanism, namely a potentiometer and servo, for generated $\Delta X$ and $\Delta Y$, than the binary gear box of the prior system.

As in the former cases, the present invention provides for computing the necessary input values of $\alpha$, $\beta$, $\Delta X$ and $\Delta Y$ in digital form and for continuously computing signal values of H, $H/D$, tan $\lambda$, and $\phi$ from these signal values, and for continuously computing the terms included in Equations 62 and 63, and for adding the terms for each equation as indicated, and for controlling the feed rate drives of the machine elements on coordinate X and Y axes accordingly.

Figure 13:
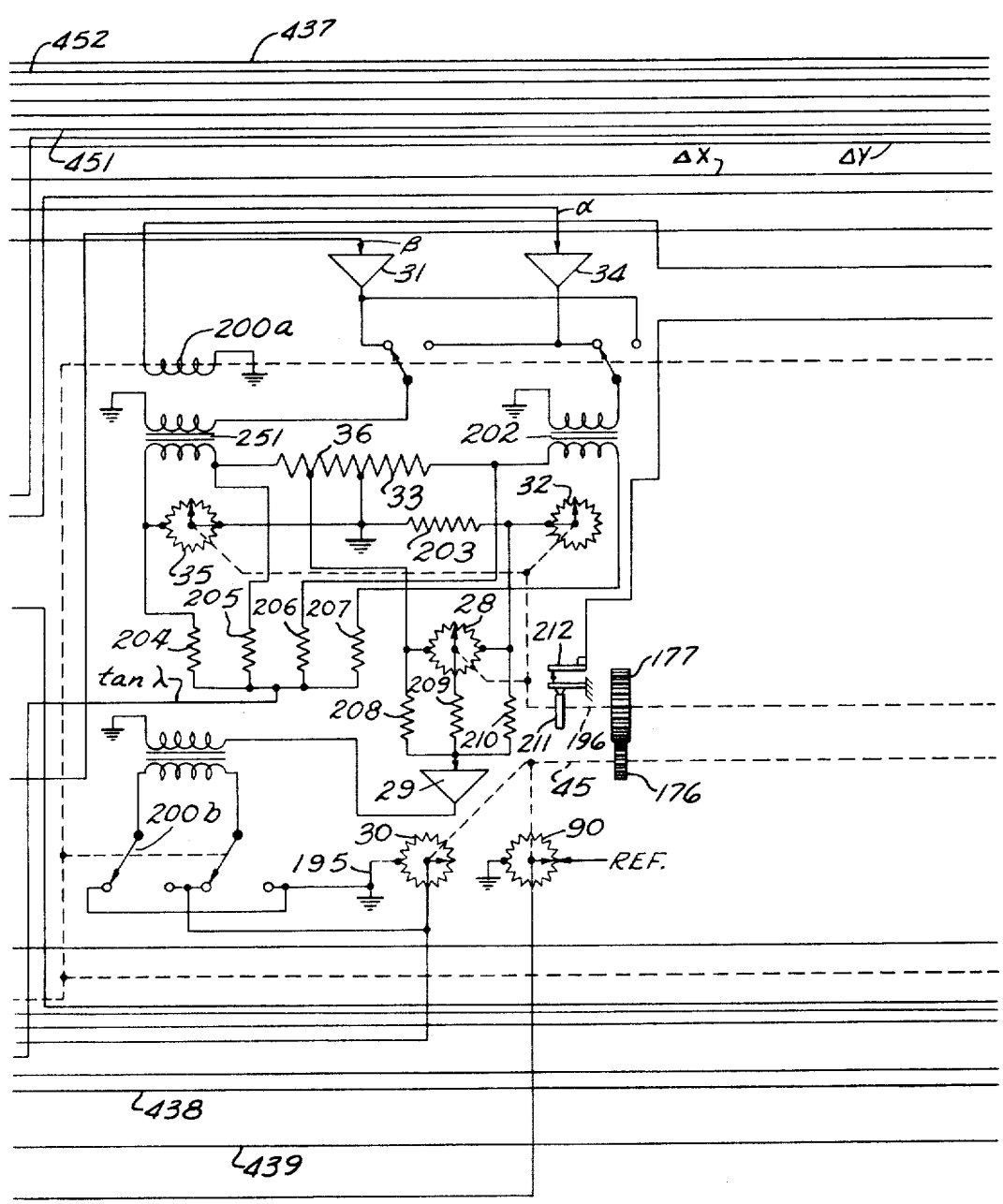

FIGS. 18, 19 and 21 illustrate 3 decimally related inputs although additional inputs may be used as indicated in the input 504. As the wiring diagram of the present case is on a single wire basis, the wire 420 in FIGS. 18 and 11 represents the inputs to the 10 steps indicated at 650 for switch 605. As the showing in FIGS. 18, 19 and 21 hereof is typical of the converters of 413, 414, $Y_1$ and $Y_2$ of FIG. 11, for example, it is illustrated as applying to the converter 413, the line 420 of FIG. 18 appearing in FIG. 11 and having the terminal 421 for connection to the translator 422 when the switch 423, operated by coil 200a, FIG. 13, is in an alternate position. In the position shown, the switch blade 424 is connecting the translator 422 to the terminal 425 of the $X_2$ converter 414, terminal 425 corresponding to terminal 421. The similar input terminals for $Y_1$ and $Y_2$ converters are shown at 426 and 427.

In the position shown in FIG. 11, the reference source 428 is connected to the terminal 429 of the $X_1$ converter 413 and to terminal 430 of $Y_1$ converter.

The switches like 605 of FIG. 18 act to store the input signal received from translator 422 as these switches maintain the position to which they have been set after the input, such as at the terminal 421, has been disconnected. This is accomplished in the following manner. A typical stepping switch is shown in more detail at 687, FIG. 19. Each stepping switch is caused to take a position corresponding to say a hole on the tape. The auxiliary relays like 542 and the stepping coils like 543 are wired so that the stepping switch steps continuously by alternately making and breaking its energizing circuit until it reaches the contact that is energized by the punched tape at which time the relay like 542 breaks the circuit to the stepping coil like 543 and the stepping switch stops. The 24-volt supply can be removed from the circuit and the switches will stay in their positions when the tape signal is removed.

Switch 605 remains in its set position and stores the digital information while the reference is applied to generate the corresponding analog outputs. It does not return to a zero position when switch 200a changes to its alternate position. Switch 605 moves to a new position (if necessary) the next time switch 200a returns to the first position.

The reference 428 is thus identified in FIG. 19 hereof and the reference terminal 429 in FIG. 11 is identified in FIG. 19 for the 10 kc. REF. In FIG. 11, the reference terminal 431 for $X_2$ converter 414 corresponds to the terminal 429. The reference terminal for $Y_2$ converter is shown at 432.

The sin and cos outputs are led to the lines 433, 434, shown as single lines, the corresponding lines being illustrated in FIG. 11 at the output of the $X_1$ converter 413. Other converters, corresponding to FIGS. 18, 19 and 21 hereof, would supply sine and cosine values to the remaining pairs of lines 435 and 436 at the output of the $X_1$ converter 413, and similarly for the three pairs of lines indicated at 437 at the output of $X_2$ converter 414, and for the three pairs of lines indicated at 438 at the output of $Y_1$ converter, and at 439 at the output of $Y_2$ converter.

Figure 15:
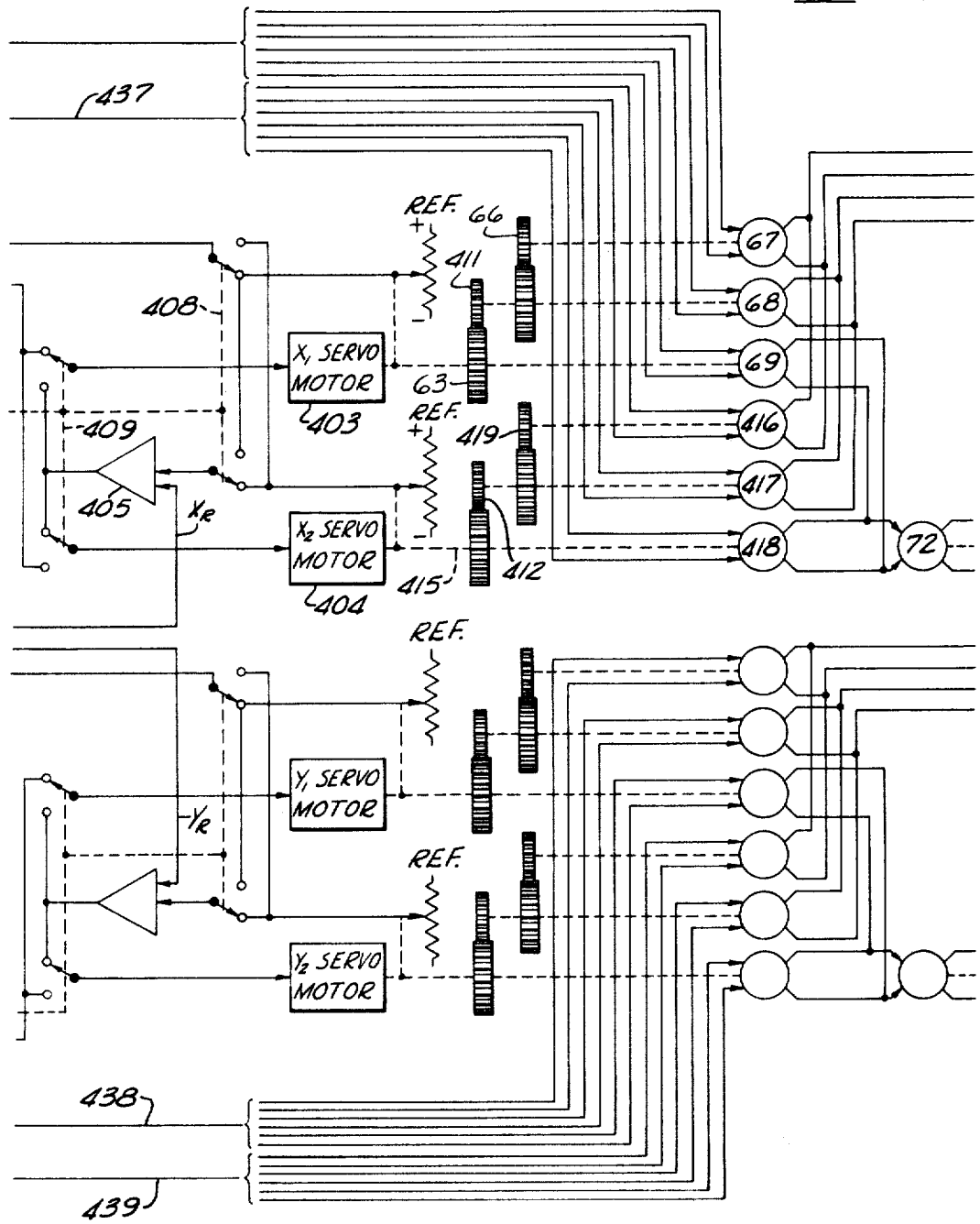

Each pair of lines, like 433 and 434, supplies an analog value of sine and cosine corresponding to the position or distance represented by the digital input as supplied to one of the differentials, or resolvers, 67, 68, 69, 416, 417, 418 for axis X as shown in FIG. 15 and to the corresponding differentials or resolvers indicated in FIG. 15 for axis Y.

In FIG. 18, the lines 655 and 662 lead to the circuit of a preceding stepping switch.

Since the operation of the system is the same for axis X and axis Y it will be described in terms of axis X only.

Figure 12:
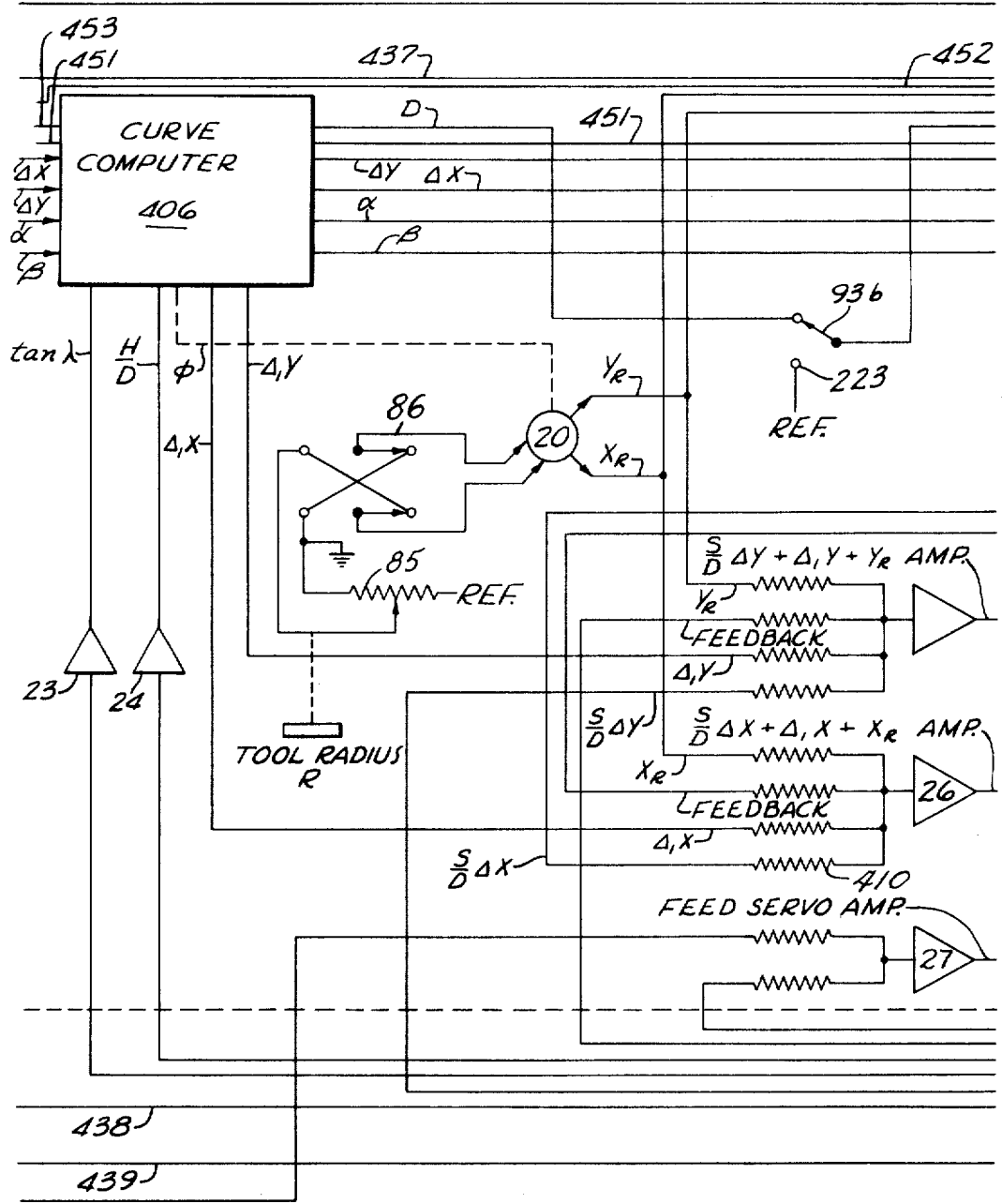
Figure 14:
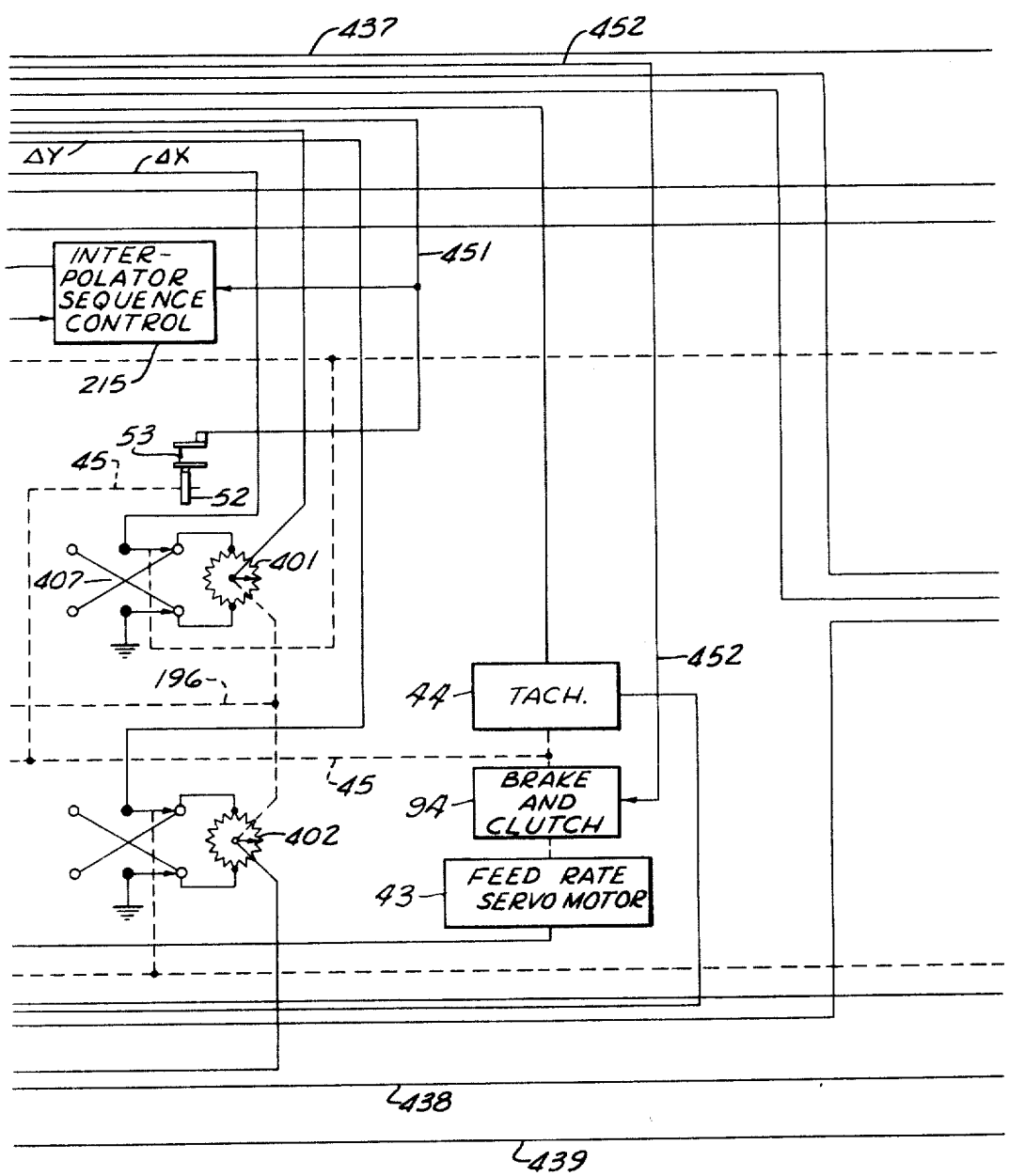

The analog value of $\Delta X$ from curve computer 406, FIG. 12, is fed through reversing switch 407, FIG. 14, to potentiometer 401. This potentiometer is mechanically driven by shaft 196 to make one-half rev. for one cycle of the system. Switch 407 is operated by coil 200a as are switches 408 and 409, FIG. 15. The swinger of potentiometer 401 linearly interpolates the voltage $\Delta X$ through one cycle. The resulting voltage $$\frac{S}{D}\Delta X$$

is applied through mixing resistor 410, FIG. 12, to the input of amplifier 26. Thus, where formerly $$\frac{S}{D}\Delta X$$

appeared on a shaft and was added to $\Delta_1 X + XR$ in a differential, it is now added to these same terms in amplifier 26. Amplifier 26 drives $X_1$ servo motor 403 and $X_2$ servo motor 404 alternatively, as selected by switch 409, FIG. 15. Potentiometers 411 and 412 serve as feedback elements. Switches 408 and 409 are in opposite positions in alternate cycles.

The operation will be described for the positions shown. $X_1$ servo motor 403 is driven by amplifier 26 to produce a position of shaft 63 (and resolvers 67, 68, 69 through gears 66) equal to $$\frac{S}{D}\Delta X + \Delta_1 X + X_R$$

These resolvers are now connected as differentials, rather than as transmitters as previously used, and add the above value to $X_1$ which is supplied by $X_1$ digital-analog converter 413. $X_1$ and $X_2$ converters 413 and 414 correspond to the position data unit previously used, and may be identical with it, as described in connection with FIGS. 18, 19 and 21. As a modification, a single set of conversion equipment with its digital input and analog outputs switched may be used to produce $X_1$ and $X_2$ alternately.

While $X_1$ motor 403 is operating as above described, $X_2$ motor 404 is driven by amplifier 405 to produce the value $X_R$ in shaft 415 and resolvers, or differentials 416, 417 and 418 through gears 419. The output of the $X_2$ differentials 416 to 418 is zero when the $X_1$ servo motor 403 is active as the reference source 428 is not connected to terminal 431 of the $X_2$ converter 414 at this time. The converters 413 and 414 are alternately activated at their terminals of 429 and 431 of switch 423. Thus, by the end of the cycle of $X_1$ the $X_2$ servo motor 404 is in the proper position to start the next cycle $X_2$ since the values of $\Delta_1 X$ and $$\frac{S}{D}\Delta X$$

are zero at the start of each cycle. At the start of cycle $X_2$, switches 407, 408 and 409 shift to the alternate position, and the $X_2$ system takes over the summation of $$\frac{S}{D}\Delta X + \Delta_1 X + X_R$$

while the $X_1$ system is resetting to the value $X_R$. Simultaneously, the position input is switched from $X_1$ to $X_2$, and the $X_1$ converter 413 can now be set to the next $X_1$ value.

Since a new input position value is used at the start of each cycle, there is no accumulation of interpolation errors.

The value $X_R$ is an output of the resolver 20, FIG. 12 when the input to that resolver is the cutter radius R, shown in FIG. 12 as being developed by a manually controlled potentiometer 85, and a mechanical rotary input equal to the slope angle $\phi$ of the required curve with respect to the machine coordinate axes, being the sum of the angles $\lambda$ and $\sigma$ as shown in FIG. 5 and discussed in connection with Equations 52 and 53. A reversing switch 86 is included in the input circuit to resolver 20 in order to provide for both positive and negative cutter radius correction.

Figure 6A:
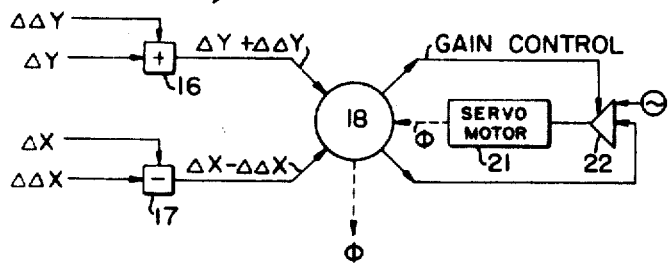
FIG. 6a is a schematic diagram of a portion of the system in FIG. 17 illustrating a resolver with its inputs and outputs for computing the slope angle $\phi$ between the X axis and the tangent at the cutting point on the curve, FIG. 6b being the corresponding geometrical diagram.
Figure 6B:
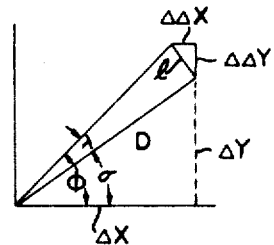
Figure 7A:
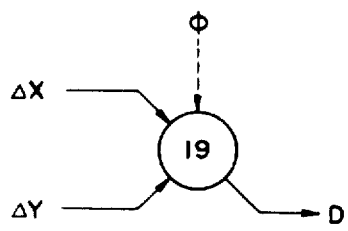
FIG. 7a is a schematic diagram of another portion of the resolver referred to above, illustrating the inputs $\Delta X$ and $\Delta Y$ for computing the chord length D, FIG. 7b being the corresponding geometrical diagram.
Figure 7B:
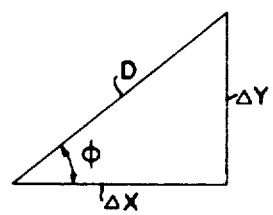
Figure 8A:
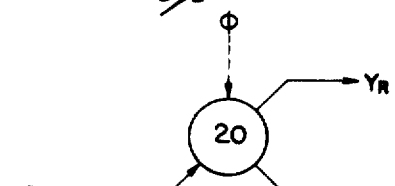
FIG. 8a is a schematic diagram of the resolver device of FIG. 12 illustrating the tool radius input to be resolved into components along the X and Y axes, FIG. 8b being the corresponding geometrical diagram.
Figure 8B:
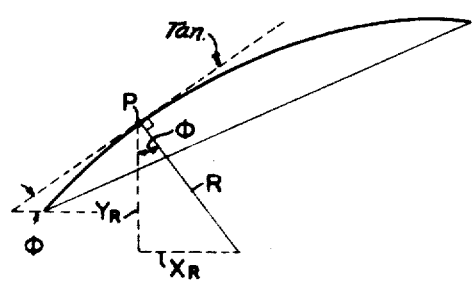
Figure 17:
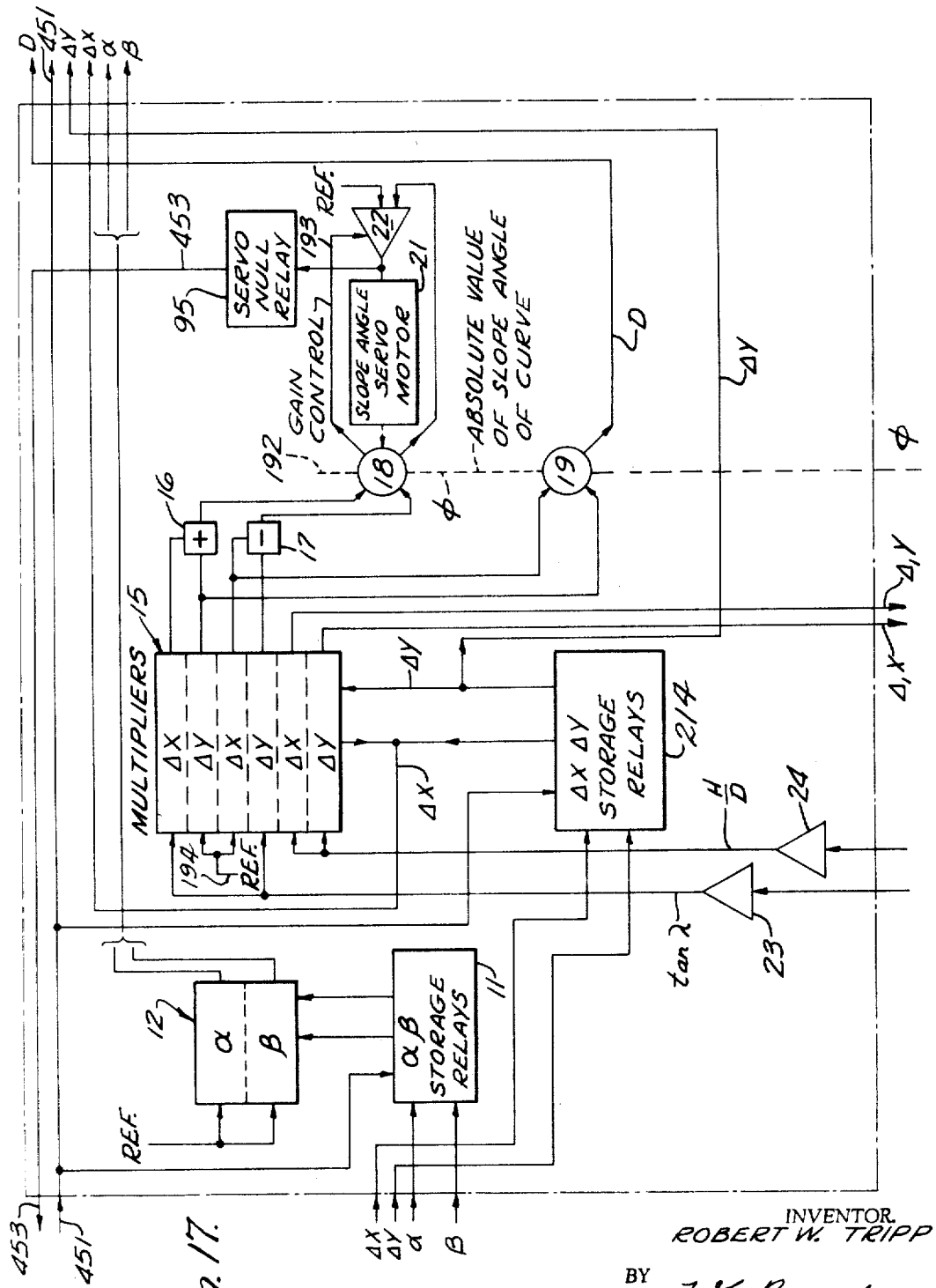
FIG. 17 is a schematic diagram of a portion of the present system showing details of the curve computer 406 of FIG. 12.

The mechanical shaft angle $\phi$ is developed by servomotor 21, FIG. 17 operating from amplifier 22 and resolver 18. FIGS. 6a and 6b described the geometry and the resolver method of solution for the development of the shaft angle $\phi$. When the inputs to resolver 18 are proportional to the sine and the cosine of the require angle $\phi$, one of the outputs of this resolver will be zero when the shaft position of said resolver corresponds to the angle $\phi$. This output is led to amplifier 22 and the output of amplifier 22 is led to the servomotor 21, so that, when the output of resolver 18 is not zero, the servo-motor 21 is caused to operate in such a direction that the position of the resolver shaft 192 will approach the angle $\phi$ and the output of the resolver 18 will approach zero. The value of the other output of the resolver 18, which also varies with the position of shaft 192, is such as to provide an effective gain control for the servo loop, and is indicated at line 193 as being so used. The inputs to resolver 18, which are proportional to the sine and the cosine of the angle $\phi$, corresponds to Equations 60 and 61. These values are developed in the multipliers 15 and summing resistors 16 and 17, FIG. 12, the product of $\Delta Y$ times a reference voltage being summed with $\Delta X$ times the input tan $\lambda$ at 16, and $\Delta X$ times a reference voltage 194 being summed with $\Delta Y$ time tan $\lambda$ at summing resistor 17. The input tan $\lambda$ is developed at amplifier 23, FIG. 17, in a manner to be described later.

Resolver 19 is also mounted on the shaft 192 representing the slope angle $\phi$, with inputs $\Delta Y$ and $\Delta X$, so that the output of this resolver represents the value of the length D of the chord. This value is fed to tachometer 44, FIG. 14 in such a way that the speed of the feed rate servomotor 43 will be inversely proportional to the length D of the chord. The tachometer 44 is a form of commercial induction generator using A.C. excitation and its output voltage at the input frequency is proportional to the product of the excitation voltage and speed.

The input $\Delta_1 X$ to amplifier 26, is an output of one of the multipliers 15, and represents the product of $\Delta Y$ and the input $H/D$, which is developed as the output of amplifier 24, FIG. 17, in a manner to be described later. The relationship can be seen by inspection of FIG. 5.

The values of $\beta$ and $\alpha$ at each point along the curve, are computed in the digital computer, in accordance with equations of the form of 33 and 34, and the values required in these equations of the proportionality constants C, are also computed in the digital computer in accordance with equations of the form of 35, 36, 37 and 38.

EVALUATION OF EQUATIONS 1 AND 2 BY INTERPOLATION CIRCUITS

The Equations 1 and 2 are evaluated by the interpolation circuits now to be described as follows:

The digital values of $\beta_a$ and $\alpha_b$, which will now be designated simply $\beta$ and $\alpha$, are converted into analog voltages by the multipliers 12, FIG. 17, which are shown in detail in FIG. 22. The $\beta$ and $\alpha$ voltages from multipliers 12 are the inputs to amplifiers 31 and 34, FIG. 13. These amplifiers are of the current feedback type, consequently the currents in the outputs are proportional to $\beta$ and $\alpha$.

With relay 200a in its alternate position, the current in the secondary of transformer 202, FIG. 13 flows through resistor 33, resistor 203 and linear potentiometer 32 which is driven by shaft 196 and makes one-half revolution for one revolution of shaft 45, FIG. 13 which corresponds to the chord length D. Shaft 45 is driven by the feed rate servomotor 43, FIG. 14.

If the wiper of potentiometer 32, which has a total resistance of $R_p$ is at the midpoint (opposite the connection of the winding) when S, the distance measured along the chord, is zero, the effective resistance is $$R_p\left(\frac{1}{2}+\frac{S}{2D}\right)\left(\frac{1}{2}-\frac{S}{2D}\right)=\frac{R_p}{4}\left(1-\frac{S^2}{D^2}\right)$$

Let $Ro$ equal the resistance across which the current from transformer 202 will develop the voltage $\beta$.

Then, if $Rp=12Ro$, the voltage across potentiometer 32 will be $$\beta\left(3-\frac{3S^2}{D^2}\right)$$

If resistor 33 has a resistance of $2Ro$, the voltage developed across it will be equal to $2\beta$ and of opposite polarity to the voltage across potentiometer 32. These voltages are summed by equal resistors 206 and 207 at the input of summing amplifier 23 to produce the term $$\beta\left(1-\frac{3S^2}{D^2}\right)$$

of Equation 2. For the above discussion, resistor 203 is assumed to be zero. Its use is discussed in connection with Equation 1.

Since the wiper of potentiometer 35 is displaced 180° from that of potentiometer 32, its resistance is equal to $$\frac{Rp}{4}\left[1-\frac{(1-S)^2}{D^2}\right]$$

thus producing the term $$\alpha\left[1-3\left(1-\frac{S}{D}\right)^2\right]$$

at the input to amplifier 23 through resistors 204 and 205, relay $200_a$ being at its alternate position, thus supplying $\alpha$ to the primary winding of transformer 251.

Thus the output of amplifier 23 is the desired value $$\lambda = \beta\left(1 - \frac{3S^2}{D^2}\right) + \alpha\left[1 - 3\left(1 - \frac{S}{D}\right)^2\right]$$

Equation 1

$$H = \left[\beta - \alpha + \beta\left(\frac{S}{D}\right) - \alpha\left(1 - \frac{S}{D}\right)\right]\frac{S(D-S)}{D}$$

is evaluated by the interpolation mechanism as follows:

Resistor 36, FIG. 13, is tapped at its midpoint to give the voltage $-\alpha$. A resistor 203 of value $Ro$ is inserted between potentiometer 32 and ground. The voltage across this resistor is $\beta$. The linear potentiometer 28 which is connected between these points and driven by shaft 196 at one-half revolution for one revolution of shaft 45 has an output voltage at its swinger of $$\beta\left(\frac{S}{D}\right) - \alpha\left(1 - \frac{S}{D}\right)$$

This voltage and the $-\alpha$ and $+\beta$ voltages are added by resistors 208, 209, 210 at the input of summing amplifier 29. This amplifier is of the current feedback type and consequently the output current is equal to $$\left[\beta - \alpha + \beta\left(\frac{S}{D}\right) - \alpha\left(1 - \frac{S}{D}\right)\right]$$

Linear potentiometer 30 is driven at the same speed as shaft 45 and has its swinger at the grounded tap 195 when $S=D$, i.e., when the distance measured along the chord is zero or D.

The effective resistance of this potentiometer 30 is $$\frac{S(D-S)}{D^2}$$

consequently the voltage appearing at the swinger of the potentiometer 30 is $$\left[\beta - \alpha + \beta\left(\frac{S}{D}\right) - \alpha\left(1 - \frac{S}{D}\right)\right]\frac{S(D-S)}{D^2} = \frac{H}{D}$$

Since resistor 203 has been added to the circuit used to evaluate Equation 2, the value of resistor 33 is increased by the same amount to a value of $3Ro$. The resistance potentiometer 28 is not critical since its net effect on the circuit used for Equation 2 is zero.

Since $$\Delta X = D \cos \sigma \text{ and } \Delta Y = D \sin \sigma$$

the multiplication of $H/D$ by these values in multiplier 15 results respectively in the desired values of $$\Delta_1 Y = H \cos \sigma \text{ and } \Delta_1 X = H \sin \sigma$$

Since potentiometers 28, 32, 35 are driven by shaft 196 and make one half revolution per revolution of shaft 45, relay 200$_a$ is provided which alternately connects the $\beta$ and $\alpha$ supply from multipliers 12, FIG. 17, either directly as shown in FIG. 13 or interchanged. The position of the relay 200$_a$ is determined by contact 212 operated by cam 211, and its time of operation is determined by switch 53. Cam 211 and potentiometers 28, 32 and 35 are driven by shaft 196 which is driven through the 2 to 1 gear ratio 176, 177. Switch 53 is operated by cam 52, FIG. 14, on the feed rate drive shaft 45. This reversal avoids the necessity of having the sliders of potentiometers 28, 32 and 35 step back to the starting points when the end of the segment like 1, 2 in FIG. 2 has been reached and a new one is to be started. The interpolator sequence control 215 combines these switching operations to activate relay 200$_a$.

The interchange of $\alpha$ and $\beta$ causes a reversal of polarity into amplifier 29 which is connected by contact 200$_b$ on relay 200$_a$ and shown near the bottom of FIG. 13.

DESCRIPTION OF THE SYSTEM OF FIGS. 11 TO 16

Figure 16:
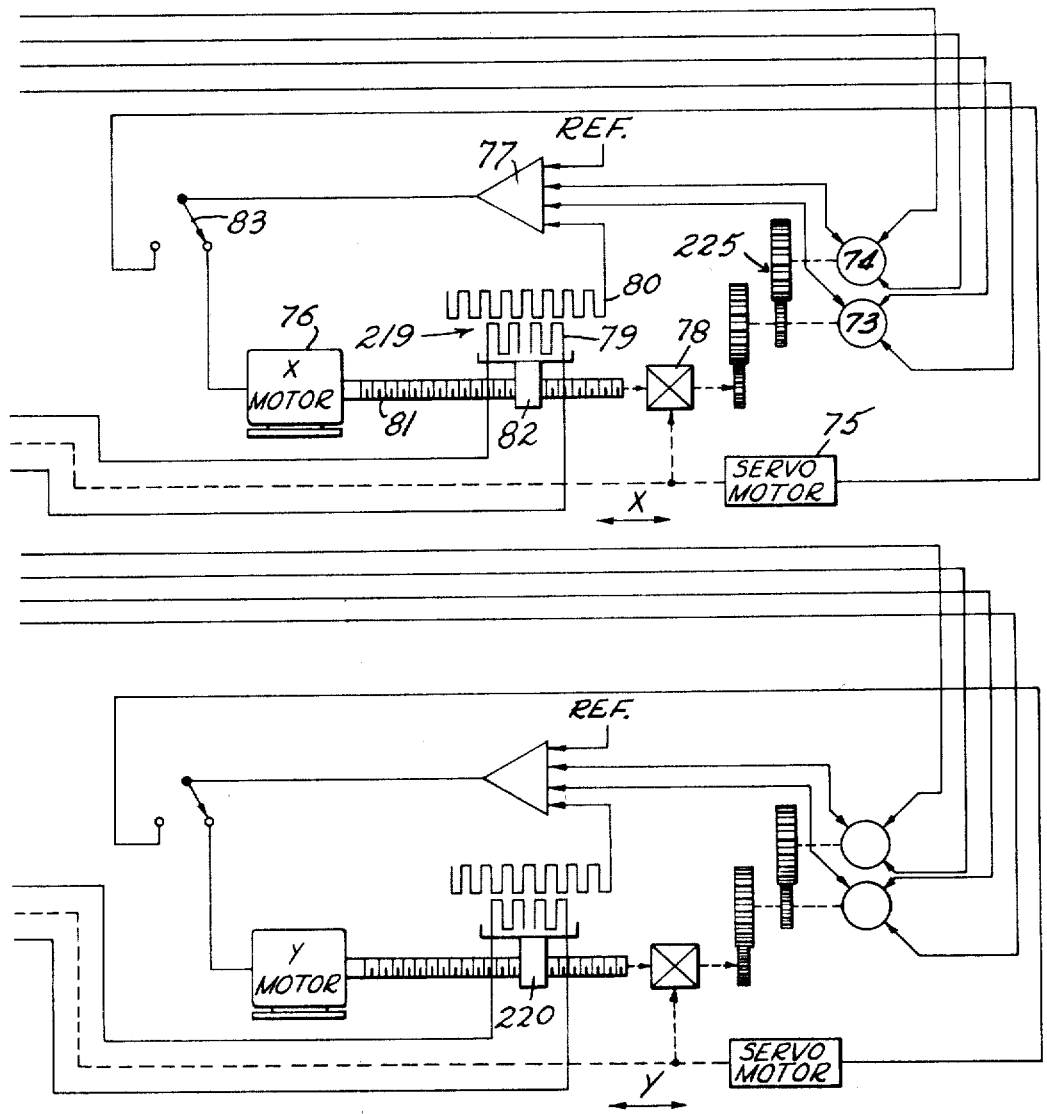

FIG. 10 shows how FIGS. 11 to 16 are arranged side-by-side, providing a diagram of the contouring machine control system. The complete control system from the numerical input on tape in FIG. 11 to the machine elements in FIG. 16 is depicted. In FIGS. 11 to 16 inclusive, dash lines represent mechanical drives. Referring particularly to FIGS. 15 and 16, resolvers 72, 73 and 74, motors 75 and 76, differential gears 78, Inductosyn 79–80, lead screw 81 and nut 82, and gear 225, and similar components in the Y axis drive, are normally mounted upon the controlled machine. The remaining electrical, electronic and mechanical components comprising the structure of the invention may be conveniently mounted in a control console.

The tape represents the numerical input to the digital computer and may be in either the form of perforated tape or other numerical input. Some digital computers use a typewriter keyboard for numerical input, and others use a simple numerical keyboard. The digital computer accepts the numerical information of the successive points along the curve to be generated and computes from this data the data required for the control equipment. In the digital computer, the successive coordinates of the points are subtracted to obtain the distances $\Delta X$, $\Delta Y$ along each axis from one point to the next. The quantities alpha and beta are also computed. The equations used for this computation have already been described.

It is entirely possible and in some cases practical to use hand methods to compute these constants. In any case, the machine shown will function most advantageously when a tape is produced with this information proper coded upon it. For curve generating, the tape will contain information of $\Delta X$, $\Delta Y$, $\alpha$ and $\beta$. When checking is desired or straight positioning is to be used, the coordinates X, Y and Z are used. Feed rate is inserted on the tape if desired, but may be inserted at the machine by the machine operator if desired.

The tape is read in the tape reader 4' which makes electrical contacts corresponding to the holes in the tape as it is fed through the tape reader 4'. These resulting electrical voltages are used to control the machine equipment through the distributor 5', which recognizes the codes on the tape and switches the corresponding electrical contacts to the correct portion of the machine control equipment. The data $\Delta X$, $\Delta Y$ and the interpolation constants $\alpha$ and $\beta$ are preferably coded in the tape in binary form. This facilitates reading this information between each pair of points and having it ready in the corresponding relay storage units 11 and 214, FIG. 17, when needed.

Position information and feed rate information are preferably coded in binary decimal form, and in this case it is routed by the distributor 5' to the translator 6' which converts the binary-decimal to straight decimal. The translator 422 then further distributes this information to the corresponding position data units, such as 413, 414. These units may advantageously be digital-to-analog converters of the type described in Patent Application 540,-429, filed Oct. 17, 1955 by Robert W. Tripp, for Automatic Machine Control and assigned to the assignee of the present application, now Patent 2,849,668 dated Aug. 26, 1958.

The storage relays 11 hold the computed $\alpha$ and $\beta$ information read in by the tape reader 4' and distributor 5' until it is required. When this information is required, it is transferred into the linear digital-to-analog converter and multplier 12 which supplies output voltages used to control the various machine motions, as will be described presently.

Similarly, the $\Delta X$ and $\Delta Y$ information is stored in relays 214. The reading cam 52 FIG. 14, and the switch 53 are used to transfer this data in at the proper times, and to cause the tape reader 4' to advance and read new data into the storage relays 11 and 214, while the machine is using the old data. The multiplier unit 15 is a set of six digital-to-analog converter transformer sets used as multipliers of the inputs indicated. These outputs are mixed as shown at 16 and 17 and applied to the resolver 18 to generate a shaft angle equal to the slope angle $\phi$ of the curve to be generated. This angle is obtained by serving the resolver 18 until the voltage applied to the amplifier 22 is zero. The input voltage to the resolver 18 depends on the distance between successive points along the curve. (Such as points 1 and 2, FIG. 2). Therefore the loop gain of the servo formed by the resolver 18, amplifier 22 and slope angle servomotor 21 must be controlled for proper servo response. This is done by using the other output of the resolver 18 to control the gain of the amplifier 22, making it approximately inversely proportional to the output of the resolver 18.

Resolver 18 positions resolvers 19 and 20 as indicated by the shaft 192.

The resolver 19 together with the tachometer 44 is used to control the rate of the feed servomotor 43 to maintain an approximately constant cutting rate independent of the length of each successive line segment of the curve to be cut. Details of this circuit are described later.

The resolver 20 is used to introduce cutter offset information into the machine control. This resolver is excited by a voltage from potentiometer 85 proportional to the radius of the cutter to be used. The reversing switch 86 permits either positive or negative radii to be used. The sine and cosine outputs of the resolver 20 are proportional to the X component and the Y component of the cutter radius. Since the shaft of the slope angle servo motor 21 is always at the slope angle φ of the curve, the cutter radius corrections are always the required values. FIGS. 6a to 8b show the geometry applying to resolvers 18, 19 and 20 respectively.

METHOD OF GENERATING CURVE

The generation of a curve is based on generating chords connecting the successive given points and then computing continuously in analog form the perpendicular distance from the chord to the desired curve using the interpolation constants α and β. This distance is resolved into its X and Y components by the ΔX, and ΔY multipliers 15, FIG. 17. To these quantities are then added the components of the offset for the cutter radius. The result is the required path for the cutter center to maintain the face of the cutter substantially tangent to the desired curve.

ZERO OFFSET

The shaft 63 drives the coarse, medium and fine data elements, or resolvers 67, 68 and 69 through the gears 66. The analog output of these resolvers 67 to 69 determines the position of the machine from moment to moment. However, the zero of the machine coordinate system may be different from that in which the part was dimensioned. Therefore, as shown in FIGS. 16 and 15, a zero offset is incorporated to make up the difference between the machine zero and the zero of the coordinate system in which the part was dimensioned. The difference in the fine data is obtained electrically by the resolver 72 driven by the servomotor 75. The differences of the coarse and medium data are obtained mechanically by the gear differential 78, acting through gears 225.

The data elements on the machine are the position measuring transformer 219 having scale 80 and slider 79 and the coarse and medium resolvers 73 and 74. The nut 82 represents the tool slide or other machine element to be positioned in accordance with the X component of the cutter center path. Similarly, the nut 220 represents the corresponding machine elemenet to be positioned in accordance with the Y component of thee cutter center path.

Zeroing of the zero offset equipment is accomplished by setting the switch 83, FIG. 16 to the left position, allowing the amplifier 77 to drive the servomotor 75, fine resolver 72, and the medium and coarse resolvers 73 and 74 through the gear differential 78, until all three of the output error signals are equal to zero. This operation is initiated after the machine is in the desired position for the numerical input being used, i.e., the cordinate system in which the part is dimensioned, as mentioned above.

Normal operation of the machine following the commands of the analog computer is obtained by leaving the switch 83 in the right-hand position, driving the motor 76 which in turn drives the screw 81. This results in a motion of the slider 79 relative to the stator scale 80, because the nut 82 is engaged with the screw 81. Also the coarse and medium data resolvers 73 and 74 are driven by the screw 81 through the differential 78, but the fine resolver 72 does not rotate because it is controlled by a non-reversible drive from the servomotor 75. This zero offset feature is described and claimed in copending application Ser. No. 638,722, now Patent No. 2,950,427.

POSITION MEASURING TRANSFORMER

The invention provides for positioning or moving the linear machine drives with great accuracy. In the embodiment to be described, this is accomplished by employing linear position measuring transformers as the fine data elements in servo systems controlled by the data elements. The coarse data element may be a conventional two-pole resolver or it may be a position measuring transformer of the type described and claimed in patent application Ser. No. 536,464, filed Sept. 26, 1955 by R. W. Tripp, now Patent 2,900,612 dated Aug. 18, 1959 the fine data element being preferably a position measuring transformer of the type described in patent application Ser. No. 509,168 filed May 18, 1955 by R. W. Tripp and J. L. Winget, now Patent 2,799,835 patented July 16, 1957 both cases being assigned to the assignee of the present application.

Such a position measuring transformer used as a fine data element is indicated at 79 and 80 in FIG. 16 and may comprise two inductively related metallic conductor patterns on glass members movable with respect to each other, one fastened to each of the machine elements whose relative positions or motions are to be controlled. One member bears a continuous winding in the form of a multiplicity of conductors disposed in a plane parallel to the direction of relative motion of the members, the conductors extending transversely of that direction. The conductors are connected into a single series circuit so that adjacent portions carry current in opposite directions transversely of the length of the array. The second member bears two windings similar to the winding of the first member but usually shorter and disposed with respect to each other in space quadrature of the cycle defined on the continuous winding of the first member by the separation, center to center, of three adjacent conductors of that winding, the separation being taken in the direction of relative motion of the two members. The members are supported for relative motion with their windings at a small and constant separation, and the design of the windings is preferably such that the voltage induced in any of them by a current in a winding of the other member is a substantially sinusoidal function of the relative position of the members, cyclical in a change of relative position of the members equal to this pole cycle.

Position measuring transformers such as 219 in FIG. 16 are similar in action to a resolver, but have a larger number of poles. The pole spacing may be one-tenth inch which corresponds to 360 electrical degrees. Experience indicates that it is possible to control positioning to an electrical angle of one milli-radian (on a 54-pole rotary transformer, one milli-radian is equivalent to four seconds of arc); the positioning control of the linear transformer is therefore 1/6280 of one-tenth inch, or approximately 16 microinches. The realizable accuracy of linear transformers of this type is of the order of one ten-thousandth of an inch.

DIGITAL-TO-ANALOG CONVERTER, FIG. 22

FIG. 22 shows the digital-to-analog converter or multiplier used in the α and β multipliers 12, and in the ΔX ΔY multipliers 15, FIG. 17.

The input voltage is applied to the primary winding 97 of transformer 96 which has five tapped secondary windings indicated at 98. The relative number of turns in each section of the secondary 98 and the relative voltage induced is indicated by the numbers 1X, 2X, 4X . . . 512X, which correspond to the successive powers of 2.

Ten relays indicated at 99, are provided, one relay for each section of one of the secondary windings 98. Relays 99, shown with their contacts in the normal or zero positions are emergized by the digital data to connect the selected secondaries in series.

Consequently, the output voltage in line 221 is proportional to the input voltage applied to primary 97 multiplied by the binary input represented by the activation of one or more of the ten relays indicated at 99.

FEED RATE

It is desirable to keep the rate of cutting constant during the contouring of a part. However, the successive segments of the curve may not be equal in length. If varying values of ΔX and ΔY are used, it will be necessary to vary the speed of the feed rate motor 43, FIG. 14, in inverse proportion to the resultant of ΔX and ΔY, i.e., length of chord D.

This is accomplished by applying the ΔX and ΔY voltages to a resolver 19, FIG. 17, set at the slope angle φ between the tangent to the curve at the cutting point and the X axis. The output of this resolver is then proportional to D, the resultant of ΔX and ΔY. This voltage is used to excite an induction tachometer 44, FIG. 14, on the feed rate motor 43. The output of this tachometer is compared to the feed rate voltage from the feed rate digital-to-analog converter 10, FIG. 11. The difference between these two voltages is used to drive the feed rate motor 43 through the amplifier 27, FIG. 12. With a rather high gain in the amplifier 27, the speed of the servomotor 43 will be such that the tachometer 44 generates a voltage essentially equal to the voltage from the feed rate converter 10. In this case, the feed rate voltage is equal to the speed of the feed rate motor 43 multiplied by the resultant of ΔX and ΔY obtained from the above mentioned resolver 19. The feed rate motor 43 therefore runs at a speed equal to the feed rate voltage divided by the resultant of ΔX and ΔY. Since the gear ratio between the machine and the feed rate motor 43 is equal to the resultant of ΔX and ΔY, the machine speed is proportional to the feed rate voltage. In other words, the chord length D obtained from resolver 19 is fed to tachometer 44 in such a way that the speed of the feed motor 43 is inversely proportional to the chord length D.

Referring to changes of the feed rate in going from one segment to another, the feed rate motor 43 has a speed inversely proportional to the chord length. The feed rates as applied are the components of the feed rate in X and Y. The combined action results in a constant resultant cutting rate.

STOPPING THE MACHINE

When it is required to stop the machine motion for an inside corner, an outside corner, or at the end of a contour, it is necessary to slow down the feed rate for a sufficient distance to prevent possible overshoot of the feed rate drive and the machine. This is accomplished by switching in a voltage different from the reference voltage 428, FIG. 11, normally used as input to the feed rate converter 10. This different voltage is obtained from a potentiometer 90, FIG. 13, on the feed rate motor shaft 45. The voltage obtained from this potentiometer 90 is amplified and limited by limiter 91 to a value equal to the reference voltage 428. However, when the potentiometer 90 nears its end point, the output voltage then decreases from this limited value to zero. The distance from the end point where this happens can be varied by varying the gain in the amplifier 92, FIG. 11, before the limiter 91. By this means, the output of the feed rate converter 10 is held constant until the machine has almost reached the desired stopping point at which time the voltage decreases to zero.

This arrangement causes the feed rate motor 43 to slow down and stop smoothly without coasting or overshoot. As shown by the switches 93a, FIG. 11, this limited voltage is used only for the routine of stopping or turning a corner. For usual continuous contour cutting, the constant reference voltage 428 is used.

To insure sufficient damping of the feed rate motor 43 as it stops, the resolved output from the ΔX and ΔY resolver 19 is replaced by a reference voltage 223. This is done with another contact 93b, FIG. 12, on the same switch 93a that controlled the feed rate reference 428 mentioned above. The reference voltage 223 replacing the ΔX and ΔY resolved voltage is greater in magnitude than any possible value of ΔX and ΔY. The insertion of the larger reference voltage 223 therefore causes an immediate slowing down of the feed rate because of the larger generated voltage from the induction generator 44. This causes a rather quick slowing down of the machine operation, followed by slowing to a stop when the end of the cycle is reached. A brake and clutch assembly 94, FIG. 14, operated by switch 53 is provided to disconnect the feed motor 43 and lock the input shaft 45 at the exact end of the cycle.

The resetting of switch 53 is in effect accomplished by the action of relay 95 when the shaft of resolver 18 has been rotated to its new φ value. The relay 95 by way of the "stop and corner control circuit" reenergizes the clutch and releases the brake 94.

CORNER ROUTINE

Corners and discontinuities in curves require some form of discontinuous operation in the analog computer. As previously described, the feed rate servomotor 43 is stopped at such corners, using the potentiometer 90 and the reference voltage 223 switched in by switch 93b. At this time, the new ΔX and ΔY data is read into the storage relays 214 and transferred in the normal manner, but the feed rate motor 43 is stopped and held stationary by the clutch-brake 94. The new data for the curve after the break or corner results in a new slope angle. It should be noted that for continuous operation, there is no change of curve slope angle between the end of one segment and the start of the next. However, the slope angle servomotor is still at the slope angle of the curve before the break. Therefore, there will be an error signal input to the amplifier 22, FIG. 17, resulting in the motor 21 running towards the new slope angle. When this slope angle servomotor 21 has reached a position corresponding to the new slope angle, the servo null relay 95, FIG. 17, will close. Relay 95 is connected in the circuits controlling the brake and clutch 94 on the feed rate motor 43. Thus, when slope angle servomotor 21 has reached its null, the feed rate motor 43 is allowed to start again and proceed along the new segment of the curve.

During the rotation of the slope angle servomotor 21, the resolver 20 is continuously computing the components of tool radius as previously described. These two outputs are continuously added to the output of the X and Y drives in the same manner as before. Therefore, the machine elements are controlled so that the cutter always remains in contact with the corner being cut. In other words, at the corner, the machine will describe a circle having a radius equal to the cutter radius selected by the adjustment of the cutter radius potentiometer 85.

The analog computer 10 has no way to determine that the above corner routine is required and this information is therefore coded on the tape. The code causes the feed rate servomotor 43 to go into the stop sequence, and the new data read in at that time causes the slope angle servomotor 21 to drive. The closing of its null relay 95 causes the brake and clutch 94 to release the feed rate rotor 43, and the cycle then continues as before. During discontinuity, as at corners, the large value of error at the output of amplifier 22 will cause relay 95 to open, braking the feed rate motor 43. When the slope angle servomotor 21 has reached its now position, the relay 95 closes allowing the feed rate motor to proceed.

An advantage in using relay 95 in this manner is that the machine will stop operating whenever the error is excessive during continuous curve operation.

The error is normally below the relay actuating value at all times except when the curve is discontinuous, at which time, the error value becomes large. This allows for continuous operation within the segment and the motor 43 does not stop and start during this time. From the above, it can be seen that the tape does not control relay 95.

Since, in proper operation, the angle $\phi$ is substantially the same at the end of one segment and the start of the next one, there is no discontinuity in the shaft angle position of motor 21. The switching of new values into the multipliers 15 at the start of a new segment therefore results in no appreciable change in the angle $\phi$ represented by the two vector values being fed into resolver 18.

With a segment, it is the values $\Delta\Delta X$ and $\Delta\Delta Y$ (see FIGS. 6a and 6b), which change smoothly and gradually, and which cause the gradual and continuous change of the $\phi$ position of the slope angle servomotor 21.

The distributor 5′ may be a stepping switch and the stop and corner control 38 and translator 422, FIG. 11, and interpolator sequence control 215, FIG. 14, may embody relays. Details of the circuits for these items are not shown as being unnecessary for an understanding of the invention and obvious to those skilled in the art from the above description of their functions.

While I have herein shown and described my invention in what I have conceived to be the most practical and preferred embodiment, it is recognized that departures may be made therefrom within the scope of my invention which is not to be limited to the details disclosed herein but is to be accorded the full scope of the claims so as to embrace any and all equivalent devices.

I claim:

1. A generator of analog signals representative of a curve comprising digital input of starting coordinates of curve segment, digital to analog conversion means for supplying analog electrical signals representative of said starting coordinates for plural axes, differential means for each axis for modifying said analog electrical signals to represent a continuous set of points along said curve segment, each of said differential means having a shaft input (which is servo-controlled by one or more analog signals) a servo for each of said shaft inputs, and an analog signal for each of said servos.

2. A generator according to claim 1 wherein one of said last mentioned analog signals for each of said servos is derived from the swinger of a potentiometer, said potentiometers having a common shaft input and each having an applied voltage proportional to the respective component of the length of the chord of said segment, said potentiometer shaft being motor-operated to produce a voltage at the swinger of each of said potentiometers starting at zero and increasing to the value of the respective applied voltage, to operate said differential means for each axis through its said servo to produce voltages representative of a continuous set of points along the chord of said curve segment.

3. A generator according to claim 2, another of said input signals to each of said servos representing the instantaneous coordinate difference between a point on said chord and on said curve.

4. A generator according to claim 3, another of said input signals to each of said servos representing the instantaneous coordinates of the radius of a cutter in engagement with said curve.

5. A generator according to claim 4 having duplicate sets of the means described thereon, only the drive motor for the potentiometer shaft being common to both sets of means, switching means to utilize one of said sets of means to generate said coordinate data of one curve segment while the other of said set of means is being set to a state representative of the start of the following curve segment, said switching means being controlled to operate to its alternate position by the position of said potentiometer shaft representing the end of one curve segment and the start of the following curve segment.

6. A generator according to claim 5 where the servos of the other of said sets of means have inputs of the signals representing the coordinates of said radius of said cutter.

7. A computer comprising an electrical motor having a rotary shaft, a feed rate signal input for controlling said motor, a potentiometer individual to each of at least two coordinate axes, each potentiometer having relatively movable members with one member serving as the input and the other member serving as the output and one member of each potentiometer having a driving connection with said shaft, a separate source of input electrical analog incremental signals of adjacent data difference supplying each of said input members, whereby the output member of each of said potentiometers has an analog output signal corresponding to the product of the position of said motor shaft and its input electrical analog signal.

8. A computer comprising an electrical motor having a rotary shaft, a feed rate input for controlling said motor, a potentiometer having relatively movable members with one member serving as the input and the other member serving as the output and one member driven by said shaft, a source of an electrical analog signal of adjacent data difference supplying said input member, whereby said output member has an analog output signal corresponding to the product of the position of said motor shaft and the electrical analog signals, a servomotor having an input of said analog output signal, said servomotor having a rotary drive output having a corresponding analog signal and acting as input to means for summing the analog signal of said rotary drive and another analog signal, and means for supplying said other analog signal.

9. A computer comprising an electrical motor having a rotary shaft, a feed rate input for controlling said motor, a potentiometer having relatively movable members with one member serving as the input and the other member serving as the output and one member driven by said shaft, a (first) source of an electrical analog signal supplying said input member, whereby said output member has an analog output signal corresponding to the product of the position of said motor shaft and the (first) electrical analog signal, a servomotor having an input of (a) said analog output signal, and (b) a (second) electrical analog signal derived from a source thereof, said servomotor having a rotary drive output having a corresponding analog signal and acting as input to means for summing the analog signal of said rotary drive and a (third) analog signal, and means for supplying said (third) analog signal, said summing means having an output of the sum of (1) the product of said feed rate signal and said first analog signal, (2) said (second) analog signal and (3) said (third) analog signal.

10. A computer according to claim 8, said electrical analog signal supplying said input member and said other analog signal being components of position represented by the analog signal output of said summing means.

11. Means providing a continuity of analog signals representative of position from successive bits of digital input data representative of position, said means comprising means for converting successive bits of digital data into successive electrical analog signals, each having a plurality of components, a pair of servomotors, switching means for supplying certain of said signal components of one bit to the electrical input circuit of one servomotor, and certain signal components of the next bit to the other servomotor in cyclic order in step with said bits, switching means for similarly cyclically supplying at least one of said signal components of one bit to the alternate servomotor to prepare it to receive the signal components of the next bit, while the active servomotor receives the components of the previous bit signal, each of said servomotors having a shaft output as input to a differential, each differential having an electrical input circuit and an electrical output circuit, switching means for similarly supplying another of said electrical signals to the differential of the active servomotor and for rendering ineffective the electrical input of the alternate differential, the electrical output circuits of said differentials being alternately active and cooperating to supply a continuity of analog signals from successive digital bits.

12. A generator of analog signals representative of a curve, said generator comprising means providing a continuity of analog signals representative of position with respect to coordinate axes from successive bits of digital input coordinate data representative of position, said means comprising means for converting successive bits of digital data into successive electrical analog signals for the axes, a pair of servomotors for each axis, switching means for supplying certain of said signals of one bit to the electrical input circuit of one servomotor and certain signals of the next bit to the other servomotor of each axis in cyclic order in step with said bits, switching means for similarly cyclically supplying at least one of said signals to the alternate servomotor of each axis to prepare them to receive the signals of the next bit, while the active servomotor of each axis receives the previous bit signal, the active servomotor of each axis having a shaft output of position representative of its input signals for the associated axis, each of said servomotors of both axes having a shaft output as input to a differential, each differential having an electrical input circuit and an electrical output circuit, switching means for similarly supplying another of said electrical signals for each axis to the differential of the active servomotor of each axis for rendering ineffective the electrical input of the alternate differential of each axis, the electrical output circuits of said differentials for each axis being alternately active and cooperating to supply a continuity of analog position signals for each axis from successive digital bits.

13. A generator according to claim 12, in combination with a machine servomotor for each axis, the analog position signals in the output circuits of the differentials for each axis acting as an input for one of said machine servomotors, and a machine tool having relatively movable elements operated by said machine servomotors respectively.

14. Means for generating a curve with reference to coordinate axes comprising a rotary potentiometer individual to each axis, a feed rate drive shaft acting as a mechanical analog input for both of said potentiometers, means supplying an electrical analog signal having a value representing distance along one of said axes and acting as an input for the potentiometer for the corresponding axis, means supplying another electrical analog signal having a value representing distance along the other axis and acting as an input for said other potentiometer, each of said potentiometers having an electrical output signal representing the product of its said electrical and mechanical inputs, a machine drive for each axis, and a machine servomotor for controlling each machine drive according to the analog signal output of the corresponding potentiometer.

15. Means for generating a curve according to claim 14, comprising a pair of curve computer servomotors in circuit between each of said potentiometers and the corresponding machine servomotor, switching means for rendering the curve computer servomotors of each pair alternatively active and passive, and when active acting as an input to its machine servomotor, separate means for supplying signals representing continuously varying values of tool radius component for each axis as a function of the slope angle of the tangent at an instantaneous cutting point on the curve, separate means for supplying the said tool radius signals for said axes to both curve computer servomotors of the respective axis, means for supplying said output signal of each potentiometer to its respective active curve computer servomotor to the exclusion of the passive curve computer servomotor and means for translating the shaft position of each active curve computer servomotor into an electrical signal acting as input to the machine servomotor for the corresponding axis.

16. Means for linearly interpolating a voltage proportional to the distance along an axis required to generate the chord to a segment of a curve, said means comprising a potentiometer having a swinger, a mechanical input comprising a shaft for driving said swinger to make ½ revolution for one cycle corresponding to one segment of the curve during presence of electrical analog signals representative of the difference in the distances along the axis of the end points of the chord, said potentiometer having a circular impedance, means providing said electrical analog signal as electrical input to opposite points on said impedance, said swinger acting to linearly interpolate said voltage.

17. A machine tool control comprising separate means for producing for coordinate axes (first) electrical signals representative of coordinate components of successive segments of a continuous curve, said components including the interpolated distance along a chord of the segment to the foot of a perpendicular from the chord to a normal point "P" on the curve, a multiplier for each axis, an analog rotary drive input for both of said multipliers, each of said multipliers having an input of said (first) signals for its respective axis, a pair of control servomotors for each axis, switching means for rendering the servomotors of each pair alternatively active and passive in producing output data, said (first) signals acting as input to the respective multiplier, separate means for producing (second) electrical signals representing coordinate components of the value of the radius of a cutter tangent to the curve point "P," means for supplying said (second) electrical signals for said axes to both of said control servomotors for the respective axis, each of said control servomotors having a rotary drive output the analog representative of the sum of its said inputs, each of said rotary drive outputs acting as in input to a differential, means for supplying (third) electrical signals representing coordinate components of the offset of the curve from the origin of the axes, said (third) electrical signals acting as inputs to both differentials for the respective axis, the differentials for each axis having a (fourth) electrical analog signal output representative of the sum of said (first), (second) and (third) signals for the respective axis, and a machine servomotor for each axis, each machine servomotor operating continuously and having an input in sequence from one or the other of the differentials for the respective axis in timed relation with the operation of said switching means.

18. A machine tool control according to claim 17, said switching means acting at the end of one segment of the curve and at the start of the next segment when the value of said (first) electrical signal is substantially zero.

19. Means for generating a curve with reference to coordinate axes comprising a rotary potentiometer for each axis, a feed rate drive shaft acting as a mechanical analog input for both of said potentiometers, means supplying successive electrical analog signals having values representing successive distances along one of said axes and acting as an input for the potentiometer for the corresponding axis, means supplying another electrical analog signal having successive values representing distances along the other axis and acting as an input for said other potentiometer, means for deriving said electrical analog signals from successive blocks of digital data representing distances along said axes of the chords of successive segments of the curve, each of said potentiometers having an electrical output signal representing the product of its said electrical and mechanical inputs, a machine drive for each axis, and separate means for servoing each machine drive according to the analog signal output of the corresponding potentiometer.

20. Means for linearly interpolating voltages proportional to the distances along coordinate axes required to generate the chords to successive segments of a curve, said means comprising an electrical motor having a rotary shaft, a feed rate input for controlling said motor, a potentiometer for each axis, each potentiometer having relatively movable members with one member serving as the input and the other member serving as the output and one member of each potentiometer attached to said shaft, said shaft acting as a mechanical input for driving the said one member of each potentiometer to make ½ revolution for one cycle corresponding to one of said segments of the curve during receipt of each successive bit of electrical analog signals representative of the difference in the distances along said axes respectively of the end points of successive chords, means providing successive bits of said electrical analog signals for each axis, said potentiometers each having a circular impedance, means supplying said electrical analog signals for each axis as an electrical input to opposite points on the impedance for the corresponding axis, and switching means for reversing each electrical analog signal input connection to its potentiometer in synchronism with said bits each half revolution of said shaft.

21. Apparatus for generating a curve from digital data on the coordinates, along plural axes, of a plurality of data points on the curve and from data on the angles between the chords joining successive of those points and the tangents to the curve at those points, said apparatus comprising:
 (a) digital to analog converters for generating analog signals representative of said coordinates ($X_n$, $Y_n$), of differences ($\Delta X$, $\Delta Y$) in said coordinates between successive of said points, and of said angles ($\alpha$, $\beta$), and
 (b) a motor developing a rotary drive, and
 (c) a computer for developing from said rotary drive and from said signals first further signals representative of the components ($\Delta_1 X$, $\Delta_1 Y$) along said axes of the distance between a working point moving along said curve and the chord spanning said working point,
said apparatus being characterized by the fact that it further includes:
 (1) rotary means (401, 402) coupled to said rotary drive for developing, from an electrical input of those of said first-named signals representative of differences in coordinates, second further signals representative of the components $$\left(\frac{S}{D}\Delta X, \frac{S}{D}\Delta Y\right)$$

along said axes of the distance between the starting point of said spanning chord and the foot of the perpendicular from said working point to said spanning chord, and
 (2) means (e.g., for the X-axis, inputs to amplifier 26, servo 403, differential resolvers 67, 68, 69) to sum, for each axis, said signal representative of the coordinate of the starting point of said spanning chord and said first and second further signals.

22. Apparatus according to claim 21 characterized by the fact that said rotary means comprise potentiometers.

23. Apparatus according to claim 21 characterized by the fact that said motor develops a rotary drive inversely related to the separation of adjacent of said data points.

24. Apparatus according to claim 21 characterized by the fact that for each axis said first and second further signals are summed and employed in a separate servo (e.g., 403 for X-axis) to develop an angular shaft position and by the fact that said signal representative of the coordinate of the starting point of said spanning chord is added to a resolver (67, 68 or 60) whose shaft is driven to said shaft position.

25. A generator of analog signals representative of a curve comprising digital input of starting coordinates of curve segment, digital to analog conversion means for supplying analog signals representative of said starting coordinates for plural axes, differential means for each axis for modifying said analog signals to represent a continuous set of points along said curve segments, each of said differential means having a shaft input which is servo-controlled by one or more analog signals, a servo for each of said shaft inputs, and an analog signal for each of said servos, characterized by the fact that for each of said axes there is also applied to said means to sum, a signal representative of the component along that axis of the radius of a curve generating tool whose radius is perpendicular to the tangent to the curve at said working point, further characterized by the fact that there are provided for each of said axes duplicate servos (403, 404) for developing a mechanical position representative of the sum of said first and second further signals and of said tool radius component signal, one (e.g., 403) of said servos receiving during one cycle of said motor the sum of said first and second further signals and of tool radius component signal while the other of said servos (e.g., 404) receives said tool radius component signal, the signal inputs to said servos being interchanged on successive of said motor cycles.

26. Apparatus according to claim 21 characterized by the fact that said means to sum include for each of said axes a resolver (e.g., 69 for the X-axis) receiving as a mechanical input a position (output of servo 403) representative of the sum of said first and second further signals, receiving as an electrical input an electrical signal (e.g., from digital to analog converter 413) representative of the coordinate of said starting point, and delivering as an output an electrical signal representative of the sum of its inputs.

27. Apparatus according to claim 21 characterized by the fact that said rotary means comprise rotary potentiometers, each potentiometer having a swinger and including a circular impedance having terminals at opposite points, one half revolution of the swinger corresponding to one cycle and to the chord length D, and a switch for reversing the electrical input each half revolution.

References Cited

UNITED STATES PATENTS

| | | |
|---|---|---|
| 3,066,868 | 12/1962 | Tripp. |
| 3,191,111 | 6/1965 | Greene _____ 318—162 |
| 3,217,220 | 11/1965 | Morris _____ 318—162 |
| 3,322,943 | 5/1967 | Hartley _____ 338—89 XR |
| 3,328,655 | 6/1967 | Tripp _____ 318—28 XR |

BENJAMIN DOBECK, *Primary Examiner.*

U.S. Cl. X.R.

318—28; 338—89